US008544519B2

(12) United States Patent
Ikeda et al.

(10) Patent No.: US 8,544,519 B2
(45) Date of Patent: Oct. 1, 2013

(54) TACK LABELER

(75) Inventors: Masahide Ikeda, Osaka (JP); Toshiya Yamada, Osaka (JP); Hiroshi Sugimoto, Osaka (JP); Hiroyuki Fujita, Osaka (JP); Akihiko Fujihira, Osaka (JP)

(73) Assignee: Fuji Seal International, Inc., Osaka-shi (JP)

( * ) Notice: Subject to any disclaimer, the term of this patent is extended or adjusted under 35 U.S.C. 154(b) by 282 days.

(21) Appl. No.: 12/867,803

(22) PCT Filed: Feb. 26, 2009

(86) PCT No.: PCT/JP2009/000849

§ 371 (c)(1), (2), (4) Date: Aug. 16, 2010

(87) PCT Pub. No.: WO2009/110197

PCT Pub. Date: Sep. 11, 2009

(65) Prior Publication Data

US 2011/0000621 A1 Jan. 6, 2011

(30) Foreign Application Priority Data

Mar. 4, 2008 (JP) ................................ 2008-053214

(51) Int. Cl.
*B29C 65/00* (2006.01)
*B32B 38/04* (2006.01)
*B32B 38/00* (2006.01)

(52) U.S. Cl.
USPC ......................... 156/521; 156/557; 156/379.8

(58) Field of Classification Search
USPC ................. 156/521, 247, 249, 263, 264, 269, 156/557, 254, 379.8
See application file for complete search history.

(56) References Cited

U.S. PATENT DOCUMENTS 5,336,541 A 8/1994 Kobayashi
5,624,520 A * 4/1997 Nedblake et al. ............. 156/249

FOREIGN PATENT DOCUMENTS

DE 10126739 A1 * 10/2003
JP 5-117604 A 5/1993

(Continued)

OTHER PUBLICATIONS

International Search Report of PCT/JP2009/000849, Mailing Date of Apr. 14, 2009.

*Primary Examiner* — Linda Gray
(74) *Attorney, Agent, or Firm* — Westerman, Hattori, Daniels & Adrian, LLP

(57) ABSTRACT

The present invention is to provide a tack labeler capable of automatically adhering tack labels without using release papers to articles to be adhered. The present invention is provided with a roll holder 10 for rotatably holding a base material pair roll MPR, a reeling-out unit 20 for reeling out a label formation base material pair LMP from the base material pair roll MPR set in the roll holder 10, a base material pair accumulation unit 30 for accumulating the reeled label formation base material pair LMP, a delivering unit 40 for bringing out and delivering the label formation base material pair LMP from the base material pair accumulation unit 30, a separating-delivering unit 50 for separating the delivered label formation base material pair LMP into label formation base materials LM and delivering the label formation base materials LM, cut units 60 for cutting the separated and delivered label formation base materials LM by predetermined length so as to form individual tack labels, and adhering units 70 for adhering the tack labels cut off from the label formation base materials LM to containers C conveyed to adhering positions.

9 Claims, 21 Drawing Sheets

(56) References Cited

FOREIGN PATENT DOCUMENTS

| | | | |
|---|---|---|---|
| JP | 9-039930 | A | 2/1997 |
| JP | 10-142742 | A | 5/1998 |
| JP | 2003-226313 | A | 8/2003 |

* cited by examiner

TACK LABELER

TECHNICAL FIELD

The present invention relates to a tack labeler for detaching a label formation base material pair into label formation base materials in which tack labels are continuously connected to each other, the label formation base material pair being to be supplied in a state that the label formation base materials are detachably pasted to each other on the adhering surface side, and then cutting the label formation base materials by predetermined length so as to form individual tack labels, thereby adhering these to articles to be adhered.

BACKGROUND ART

Since general tack labels are supplied in a state that the tack labels are adhered to release papers, cost is increased for the release papers. Moreover, there is a problem that the release papers have to be disposed as waste after detaching the tack labels. Thus, in recent years, two tack labels are supplied in a state that the tack labels are detachably adhered to each other serving as one label pair without using the release papers, and the detached two tack labels are adhered at the same time when used.

Patent Document 1: Japanese Unexamined Patent Publication No.

DISCLOSURE OF THE INVENTION

Problems to be Solved by the Invention

When the above two tack labels are detachably adhered to each other, the labels are less easily handled than the tack labels adhered to the release papers. Thus, the tack labels are generally supplied in a sheet state and manually adhered.

An object of the invention is to provide a tack labeler capable of automatically adhering this type of tack labels without using the release papers to articles to be adhered.

Solutions to the Problems

In order to solve the above problems, a claim 1 of the present invention provides a tack labeler, including: base material pair delivering means for reeling out and delivering a label formation base material pair from a base material pair roll formed by winding the label formation base material pair in a rolled shape, the label formation base material pair being formed by detachably pasting, to each other on the adhering surface side, label formation base materials in which tack labels are continuously joined to each other; separating-delivering means for separating the delivered label formation base material pair into the label formation base materials and respectively delivering the label formation base materials; cutting means for successively cutting the respective separated label formation base materials so as to form individual tack labels; adhering means for adhering the formed individual tack labels to articles to be adhered; and control means for controlling actions of the base material pair delivering means, the separating-delivering means, the cutting means and the adhering means, wherein the separating-delivering means has a pair of suction drive rollers respectively arranged on the both sides of the label formation base material pair so as to nip the label formation base material pair, the suction drive rollers being adapted to deliver the label formation base materials in the directions in which the label formation base materials are brought away from each other while suctioning and holding the respective separated label formation base materials onto outer circumferential surfaces.

A claim 2 of the present invention provides a tack labeler, including: base material pair delivering means for reeling out and delivering a label formation base material pair from a base material pair roll formed by winding the label formation base material pair in a rolled shape, the label formation base material pair being formed by detachably pasting, to each other on the adhering surface side, label formation base materials in which tack labels are continuously joined to each other; separating-delivering means for separating the delivered label formation base material pair into the label formation base materials and respectively delivering the label formation base materials; cutting means for successively cutting the respective separated label formation base materials so as to form individual tack labels; adhering means for adhering the formed individual tack labels to articles to be adhered; and control means for controlling actions of the base material pair delivering means, the separating-delivering means, the cutting means and the adhering means, wherein the separating-delivering means has rotating main rollers respectively arranged on the both sides of the label formation base materials so as to nip the label formation base materials, and auxiliary rollers for nipping the respective separated label formation base materials with the main rollers, and two pairs of the main rollers and the auxiliary rollers are adapted to deliver the nipped label formation base materials in the directions in which the label formation base materials are brought away from each other.

A claim 3 of the present invention provides the tack labeler according to claim 2, wherein the auxiliary rollers are brought into contact with the adhering surface side of the label formation base materials, adhering surfaces of the respective label formation base materials forming the label formation base material pair have band shape adhesive and non-adhesive areas extending in the longitudinal direction formed alternately in the width direction so that the adhesive areas of both the label formation base materials are not brought into contact with each other in a state that the adhering surfaces are pasted to each other, and the auxiliary rollers are installed at positions corresponding to the non-adhesive areas so as not to be brought into contact with the adhesive areas of the adhering surfaces of the label formation base materials.

A claim 4 of the present invention provides the tack labeler according to claim 1, wherein the cutting means cuts the label formation base materials by a guillotine type cutter, and when the tack labels are cut off from the label formation base materials by the cutter, the control means reversely rotates a pair of the suction drive rollers so that cut ends of the label formation base materials are temporarily brought away from the cutter.

A claim 5 of the present invention provides the tack labeler according to claim 2 or 3, wherein the cutting means cuts the label formation base materials by a guillotine type cutter, and when the tack labels are cut off from the label formation base materials by the cutter, the control means reversely rotates the main rollers so that cut ends of the label formation base materials are temporarily brought away from the cutter.

A claim 6 of the present invention provides the tack labeler according to claim 1, 2, 3, 4, or 5 wherein the cutting means cuts the label formation base materials by a guillotine type cutter, the adhering means includes a suction head for suctioning and holding the tack labels cut off from the label formation base materials by the cutter, a first drive portion for bringing the suction head close to and away from the cutter, and a second drive portion for moving the suction head forward and backward relative to the articles to be adhered, and the control means moves the suction head suctioning and holding the tack labels cut off from the label formation base materials by the cutter forward to the side of the articles to be adhered by the second drive portion in a state that the suction head is brought away from the cutter by the first drive portion, thereby adhering the tack labels to the articles to be adhered.

In the invention of claim 7, a laser cutting device is used as the cutting means in the tack labeler according to the invention of claim 1, 2 or 3.

ADVANTAGES OF THE INVENTION

With the tack labeler according to the invention of claim 1 formed as described above, when a beginning end of the label formation base material pair delivered from the base material pair delivering means is detached and the suction drive rollers are rotated in a state that the beginning end is suctioned and held onto the outer circumferential surfaces of the suction drive rollers, the two label formation base materials pasted to each other are continuously separated from each other. Thus, the respective separated label formation base materials are successively cut by the cutting means so as to form the individual tack labels, and these tack labels are reliably adhered to the articles to be adhered by the adhering means.

With the tack labeler according to the invention of claim 2, when a beginning end of the label formation base material pair delivered from the base material pair delivering means is detached and the main rollers are rotated in a state that the beginning end is nipped between the main rollers and the auxiliary rollers, the two label formation base materials pasted to each other are continuously separated from each other. Thus, the respective separated label formation base materials are successively cut by the cutting means so as to form the individual tack labels, and these tack labels are reliably adhered to the articles to be adhered by the adhering means.

In this type of tack labels without using release papers, the adhering surfaces have the band shape adhesive and non-adhesive areas extending in the longitudinal direction formed alternately in the width direction so that the adhesive areas of both the label formation base materials are not brought into contact with each other in a state that the adhering surfaces are pasted to each other. Thus, as the tack labeler according to the invention of claim 3, when the auxiliary rollers brought into contact with the adhering surface side of the label formation base materials are installed at the positions corresponding to the non-adhesive areas so as not to be brought into contact with the adhesive areas of the adhering surfaces of the label formation base materials, adhesives forming the adhesive areas are not stuck onto the auxiliary rollers and the label formation base materials can be smoothly delivered.

With the tack labeler according to the invention of claim 4, when the tack labels are cut off from the label formation base materials by the cutter, a pair of the suction drive rollers is reversely rotated, so that the cut ends of the label formation base materials are temporarily brought away from the cutter. Thus, the cut ends of the label formation base materials are not stuck onto the cutter and the label formation base materials can be smoothly and reliably delivered.

With the tack labeler according to the invention of claim 5, when the tack labels are cut off from the label formation base materials by the cutter, the main rollers are reversely rotated, so that cut ends of the label formation base materials are temporarily brought away from the cutter. Thus, the cut ends of the label formation base materials are not stuck onto the cutter, and the label formation base materials can be smoothly and reliably delivered.

With the tack labeler according to the invention of claim 6, the suction head suctioning and holding the tack labels cut off from the label formation base materials by the cutter is moved forward to the side of the articles to be adhered in a state that the suction head is brought away from the cutter, thereby adhering the tack labels to the articles to be adhered. Thus, at the time of moving the suction head forward to the side of the articles to be adhered, circumferential edges of the tack labels are not brought into contact with and stuck onto the cutter. Therefore, the tack labels suctioned and held onto the suction head are neither displaced nor dropped off from the suction head, the tack labels can be reliably adhered to predetermined positions of the articles to be adhered.

With the tack labeler according to the invention of claim 7, the laser cutting device is used as the cutting means. Thus, even without performing complicated control such as temporarily bringing the cut ends of the label formation base materials away from the cutter in order to prevent the cut ends of the label formation base materials from being stuck onto the cutter as in the case where the guillotine type cutter is used, the label formation base materials can be smoothly and reliably delivered. Moreover, even without adding an extra action such as bringing the suction head suctioning and holding the tack labels cut off from the label formation base materials away from the cutter in order to prevent the circumferential edges of the tack labels from being brought into contact with and stuck onto the cutter as in the case where the guillotine type cutter is used, the tack labels suctioned and held onto the suction head are neither displaced nor dropped off from the suction head, and the tack labels can be reliably adhered to predetermined positions of the articles to be adhered.

DESCRIPTION OF REFERENCE SIGNS

Figure 1:
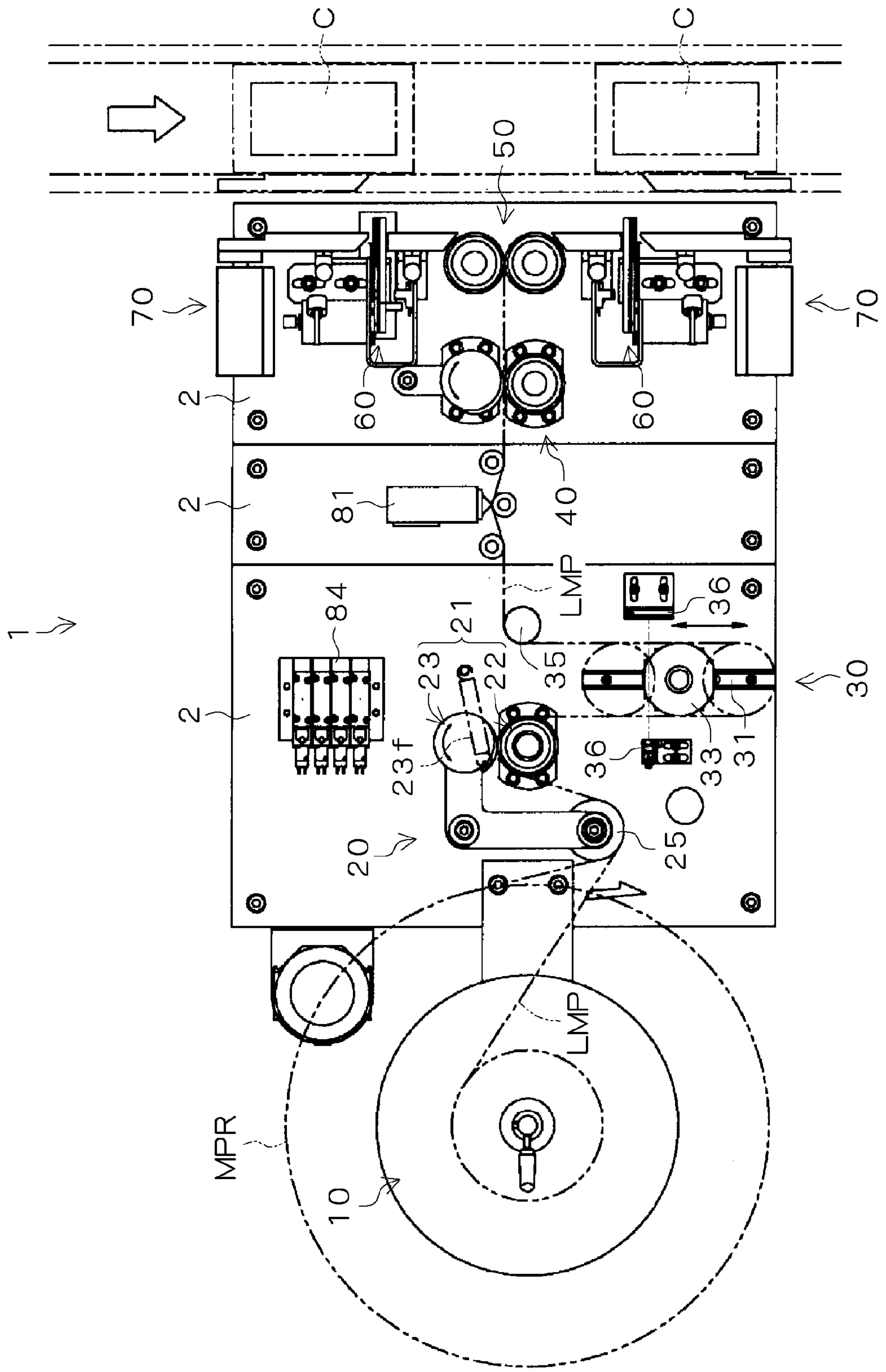
FIG. 1 is a plan view showing one embodiment of a tack labeler according to the invention.

1, 1A: Tack labeler
10: Roll holder
20: Reeling-out unit
21: Reeling-out nip roller
22: Driving roller
23: Driven roller
24: Geared motor
25: Guide roller
30: Base material pair accumulation unit
31: Slide base
32: Slider
33: Dancer roller
34: Coil spring
35: Guide roller
36: Roll detection sensor
40: Delivering unit
41: Delivering nip roller
42: Driving roller
43: Driven roller
44: Servomotor
50, 50A: Separating-delivering unit
51: Suction drive roller
51A: Auxiliary roller
54: Suction plate
60: Cut unit
70, 70A: Adhering unit
71: Suction plate
72: Drive cylinder
73: Drive cylinder
81: Mark sensor
82: Suction blower
83: Vacuum valve
84: Air valve
91A, 91B: Suction drive roller
92, 93: Center shaft
92*a*, 93*a*: Main suction passage
92*b*, 93*b*: Recess
92*c*, 93*c*: Communication passage
92*d*, 93*d*: Connection elbow
93D: Lower shaft
93M: Middle shaft
93U: Upper shaft
94: Roller pipe
94*a*: Suction hole
94A: Main body portion
94B: Cover portion
95: Knob
96: Coil spring
97: Servomotor
98: Gear
98A, 98B: Gear
99: Guide plate
C: Container
AL: Adhesive layer
BL: Base material layer
IL: Indicated print layer
PL: Non-adhesive layer
LM: Label formation base material
LMP: Label formation base material pair
MPR: Base material pair roll
TL: Tack label

EMBODIMENTS OF THE INVENTION

Figure 2:
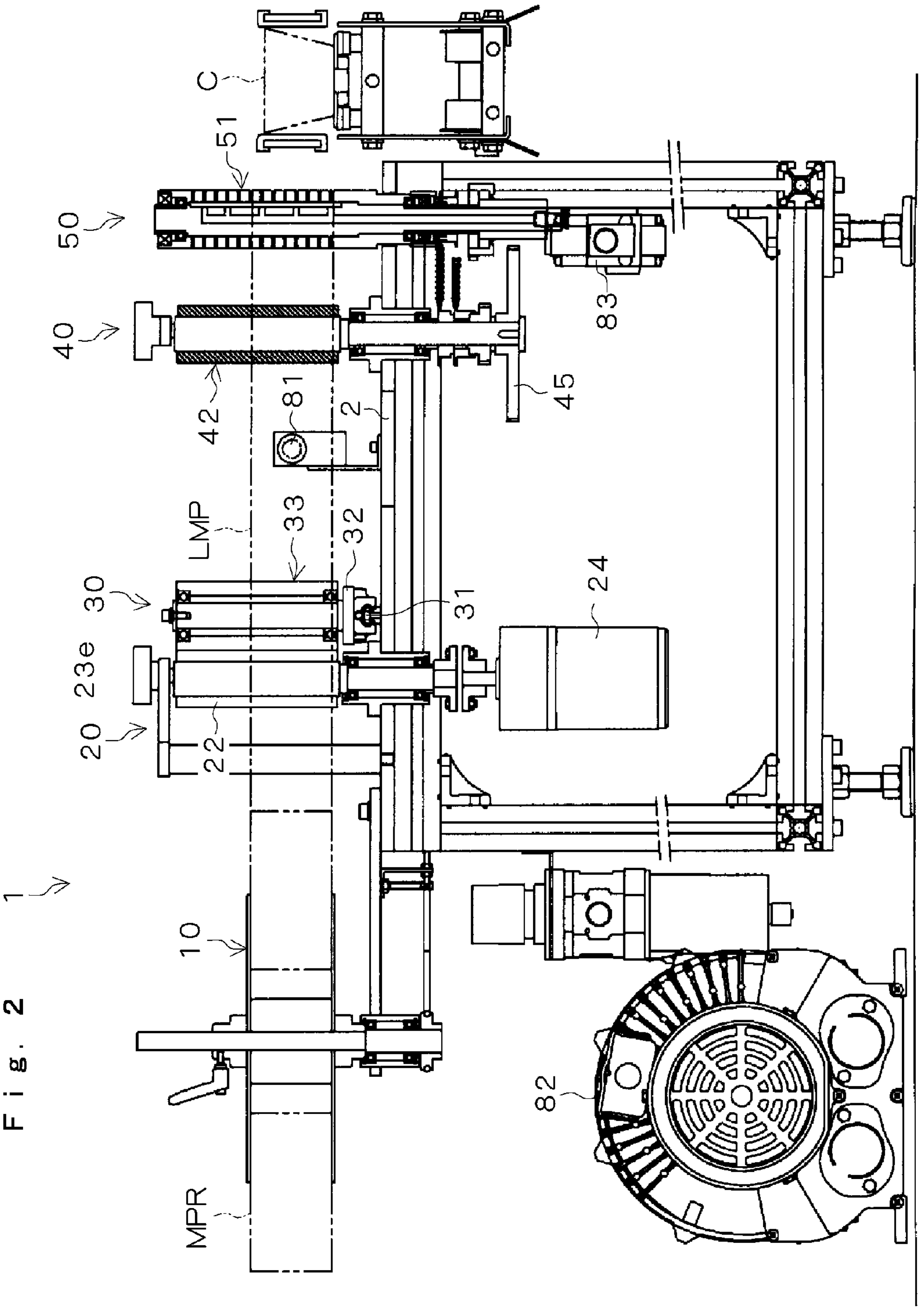
FIG. 2 is a vertical sectional view showing the same tack labeler.
Figure 3:
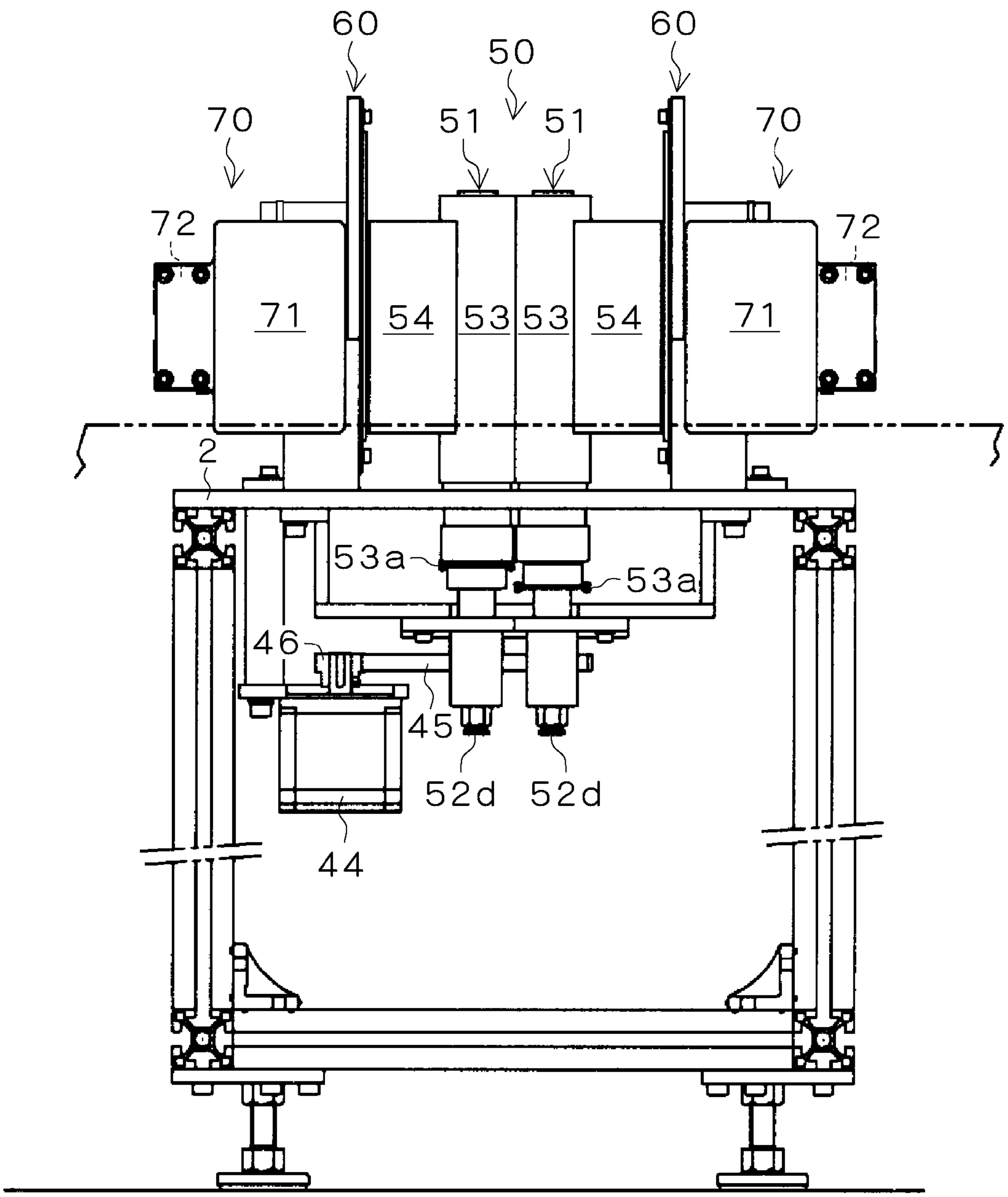
FIG. 3 is a front view showing the same tack labeler.

Hereinafter, embodiments will be described with reference to the drawings. FIGS. 1 to 3 show a tack labeler 1 for reeling out a label formation base material pair LMP from a base material pair roll MPR formed by winding the label formation base material pair LMP in a rolled shape, the label formation base material pair LMP being formed by detachably pasting, to each other on the adhering surface side, long-band shape label formation base materials LM in which tack labels are continuously joined to each other, detaching the label formation base material pair LMP into the label formation base materials LM, and then cutting the respective label formation base materials LM by predetermined length so as to form the tack labels, thereby adhering the tack labels to trunk portions of cup shape containers C.

Figure 13:
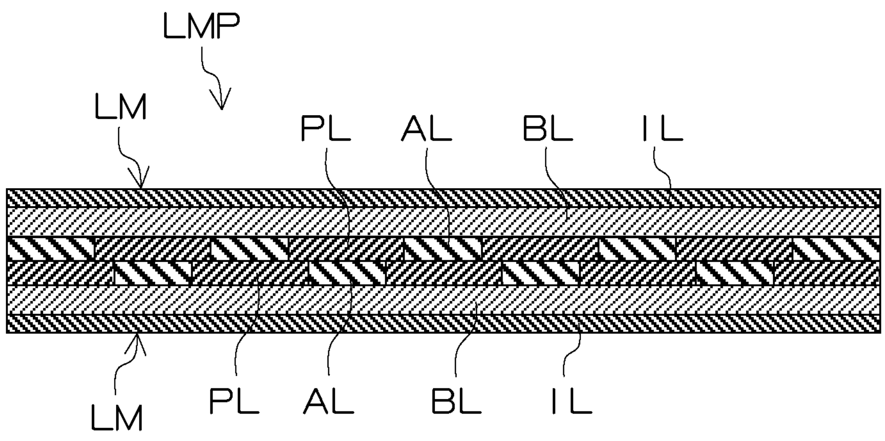
FIG. 13 is a sectional view showing a label formation base material pair used in the same tack labeler.
Figure 14:
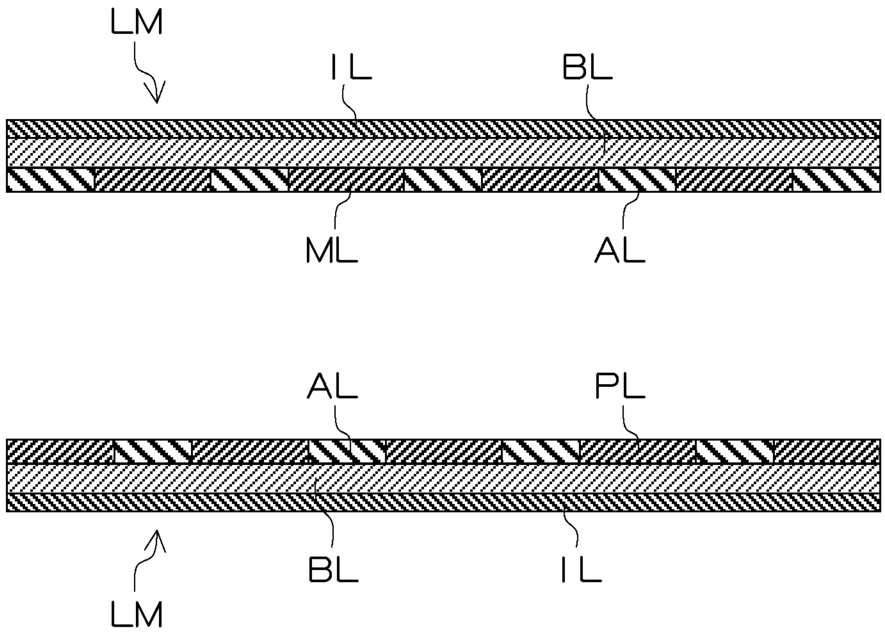
FIG. 14 is a sectional view showing label formation base materials forming the same label formation base material pair.
Figure 15:
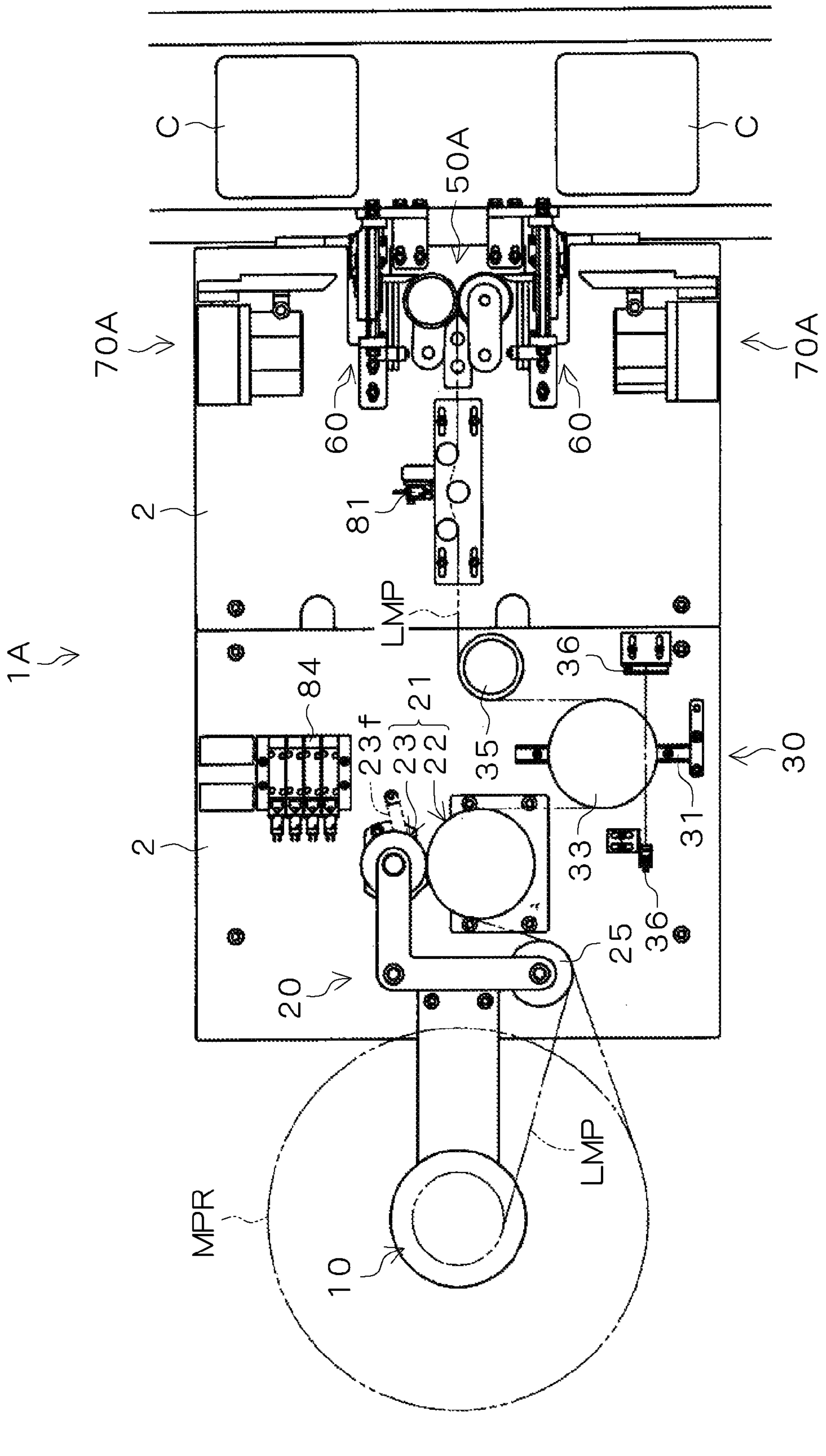
FIG. 15 is a plan view showing a tack labeler according to one of the other embodiments.
Figure 16:
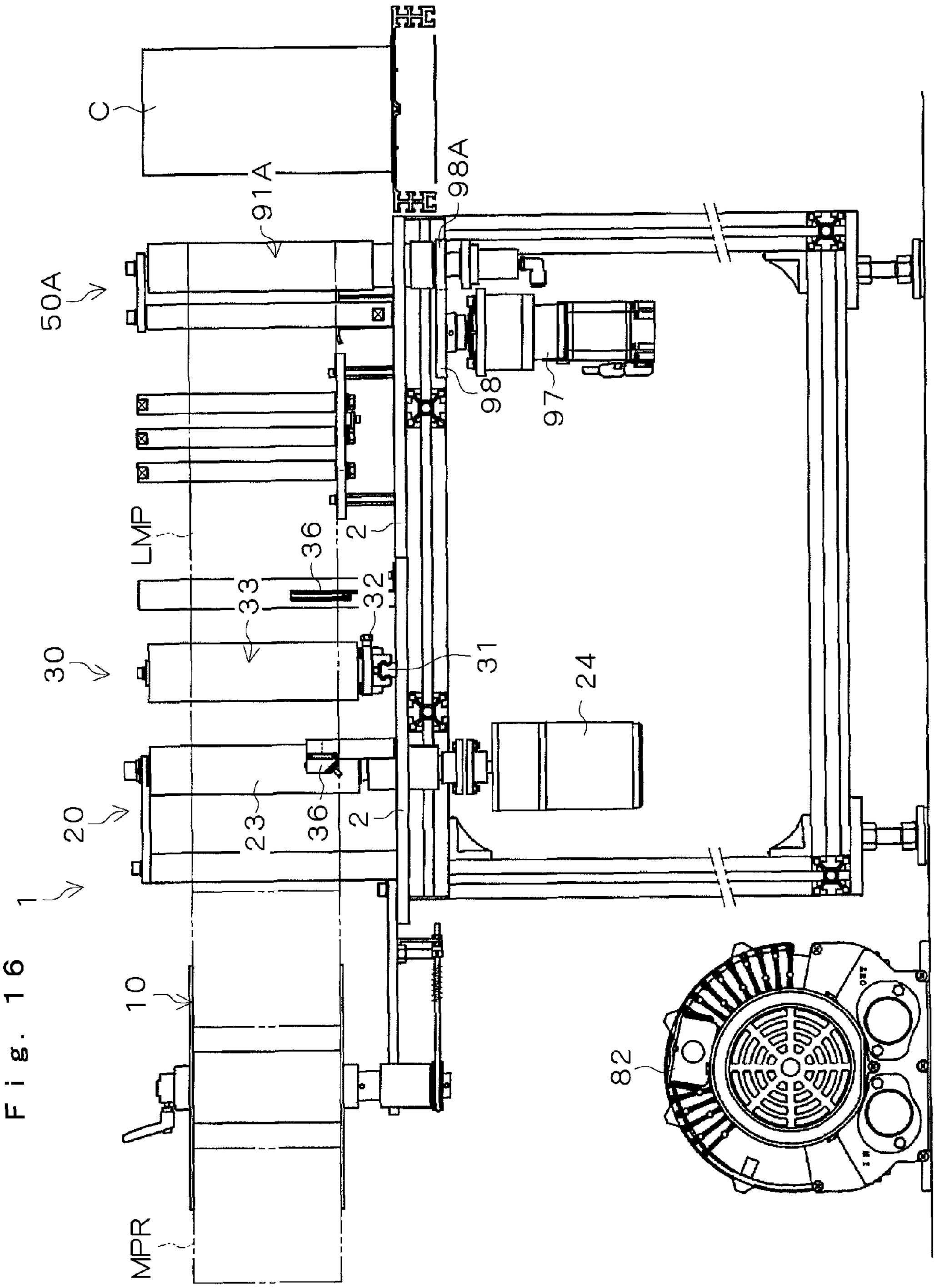
FIG. 16 is a side view showing the same tack labeler.

As shown in FIGS. 13 and 14, each of the label formation base materials LM includes a base material layer BL made of a plastic film or a synthetic paper, an indicated print layer IL laminated on an outer surface of the base material layer BL, and adhesive layers AL made of hot-melt resin and non-adhesive layers PL made of silicon resin which are laminated on an inner surface of the base material layer BL. The adhesive layers AL and the non-adhesive layers PL are alternately disposed in the width direction of the base material layer BL. In the label formation base materials LM forming the label formation base material pair LMP, in order to prevent the adhesive layers AL of both the label formation base materials LM from being brought into contact with each other in a state that the label formation base materials LM are pasted to each other, the non-adhesive layers PL are disposed in a state that the non-adhesive layers are displaced from each other in the width direction.

As shown in the same figures, the tack labeler 1 is provided with a roll holder 10 for rotatably holding the base material pair roll MPR, a reeling-out unit 20 for reeling out the label formation base material pair LMP from the base material pair roll MPR set in the roll holder 10, a base material pair accumulation unit 30 for accumulating the label formation base material pair LMP reeled out by the reeling-out unit 20, a delivering unit 40 for bringing out and delivering the label formation base material pair LMP from the base material pair accumulation unit 30, a separating-delivering unit 50 for separating the label formation base material pair LMP delivered by the delivering unit 40 into the label formation base materials LM and delivering the label formation base materials LM, cut units 60 having guillotine type cutters for cutting the label formation base materials LM delivered by the separating-delivering unit 50 by predetermined length so as to form individual tack labels, adhering units 70 for adhering the tack labels cut off from the label formation base materials LM to the containers C conveyed to adhering positions, a main control unit (not shown) for wholly controlling actions of the units, and an auxiliary control unit (not shown) for controlling a delivering action of the label formation base material pair LMP by the delivering unit 40 while working together with the main control unit. A mark sensor 81 for detecting marks printed at predetermined positions corresponding to the tack labels in the label formation base material pair LMP is installed between the base material pair accumulation unit 30 and the delivering unit 40.

As shown in FIGS. 1 and 2, the reeling-out unit 20 is provided with a reeling-out nip roller 21 stood on a base plate 2, the reeling-out nip roller 21 including a driving roller 22 and a driven roller 23, a geared motor 24 for rotating the driving roller 22 of the reeling-out nip roller 21, and a guide roller 25 installed between the base material roll pair MPR which is set in the roller holder 10 and the reeling-out nip roller 21. When the driving roller 22 is rotated by the geared motor 24 in a state that the label formation base material pair LMP is nipped by the driving roller 22 and the driven roller 23, the label formation base material pair LMP is reeled out from the base material roll pair MPR set in the roll holder 10.

Figure 4:
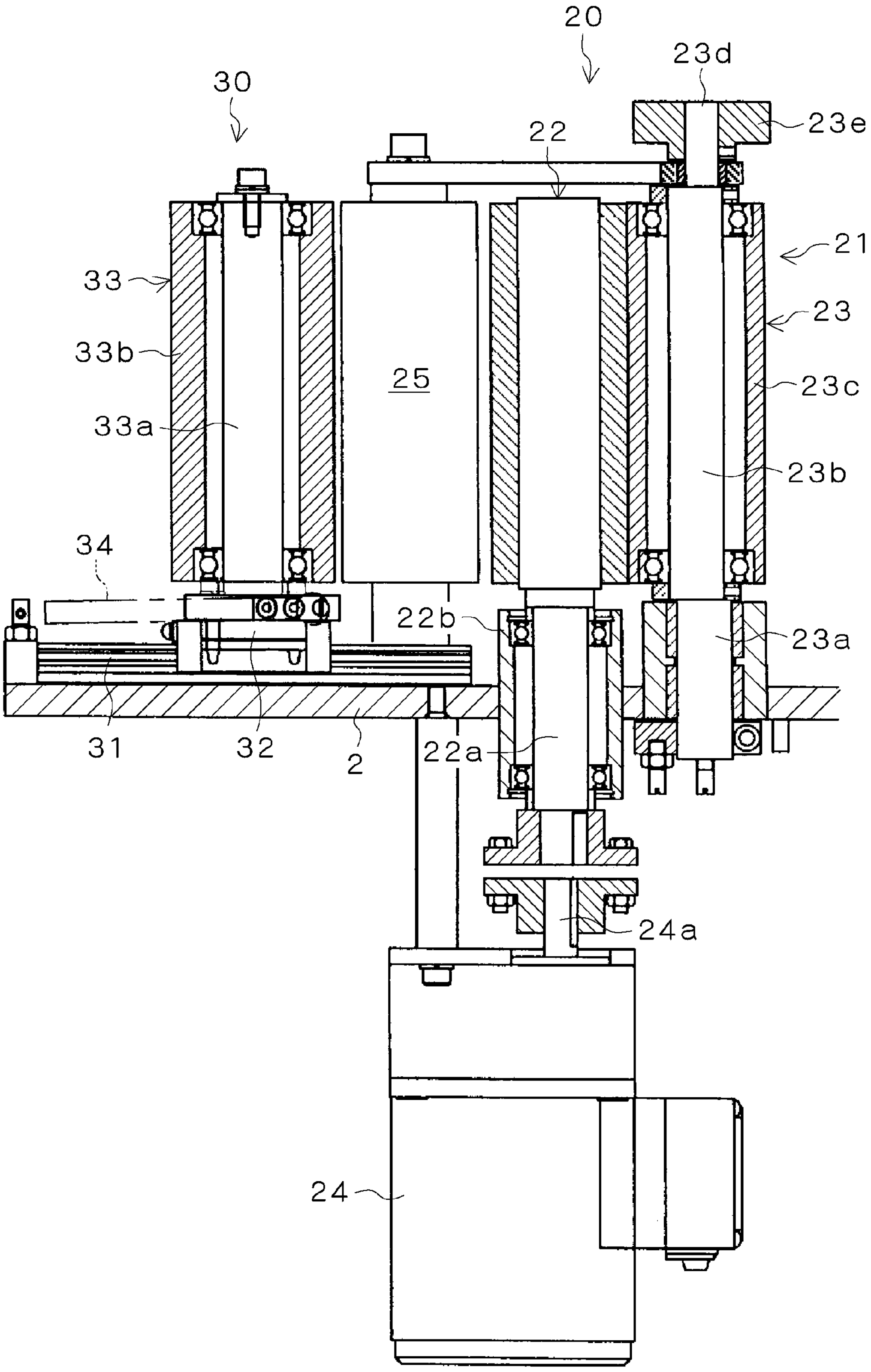
FIG. 4 is a vertical sectional view showing a part including a reeling-out unit and a base material pair accumulation unit in the same tack labeler.

As shown in FIG. 4, in the driving roller 22, a center shaft **22*a* protruding on the lower side is rotatably supported on the base plate 2 via bearings 22*b*. The center shaft 22*a* of the driving roller 22 is directly connected to a drive shaft 24*a* of the geared motor 24 fixed to a lower surface of the base plate 2**.

As shown in FIG. 4, the driven roller 23 is provided with a lower shaft **23*a* rotatably supported on the base plate 2, a middle shaft 23*b* coupled to the lower shaft 23*a* in a state that the middle shaft is eccentric to a rotation center of the lower shaft 23*a*, a roller pipe 23*c* rotatably supported on the middle shaft 23*b* via bearings, an upper shaft 23*d* coupled to the middle shaft 23*b* so that a rotation center matches with the rotation center of the lower shaft 23*a*, and a knob 23*e* fixed to the upper shaft 23*d*. When the knob 23*e* is rotated in the direction shown by an arrow in FIG. 1, the roller pipe 23*c* is brought close to and away from the driving roller 22. Moreover, the roller pipe 23*c* is always biased by a coil spring 23*f* in the direction in which the roller pipe is brought close to the driving roller 22**.

The base material pair accumulation unit 30 is provided with a slide base 31 installed on the opposite side of the driven roller 23 relative to the driving roller 22 of the reeling-out unit 20, the slide base extending in the width direction of the base plate 2, a slider 32 moving along the slide base 31, a dancer roller 33 stood on the slider 32, the dancer roller 33 including a center shaft **33*a*, and a roller pipe 33*b* rotatably supported on the center shaft 33*a* via bearings, a coil spring 34 for biasing the slider 32 toward one end of the slide base 31 (outward in the width direction of the base plate 2), and a guide roller 35. The label formation base material pair LMP reeled out by the reeling-out nip roller 22 is alternately hanged over the driving roller 23, the dancer roller 33, and the guide roller 35**.

A roll detection sensor 36 formed by a transmissive type photoelectric sensor for detecting the dancer roller 33 is installed on the side of a moving route of the dancer roller 33, in a middle part of the moving range. When an accumulation amount of the label formation base material pair LMP is increased, that is, when the dancer roller 33 is moved outward in the width direction of the base plate 2, the dancer roll 33 is not detected by the roll detection sensor 36. However, when the accumulation amount of the label formation base material pair LMP is decreased, that is, when the dancer roller 33 is moved inward in the width direction of the base plate 2, the dancer roll 33 is detected by the roll detection sensor 36.

While the dancer roll 33 is detected by the roll detection sensor 36, that is, while the accumulation amount of the label formation base material pair LMP is in short, a reeling-out action of the label formation base material pair LMP by the reeling-out unit 20 is executed. When the dancer roll 33 is not detected by the roll detection sensor 36, that is, when the label formation base material pair LMP is sufficiently accumulated, the control unit (not shown) controls ON/OFF of the geared motor 24 of the reeling-out unit 20 so that the reeling-out action of the label formation base material pair LMP by the reeling-out unit 20 is stopped.

As shown in FIGS. 1 to 3, 5 and 6, the delivering unit 40 is provided with a delivering nip roller 41 stood on the base plate 2, the delivering nip roller 41 including a driving roller 42 and a driven roller 43, and a servomotor 44 for rotating the driving roller 42 of the delivering nip roller 41. When the driving roller 42 is rotated by the servomotor 44 in a state that the label formation base material pair LMP is nipped by the driving roller 42 and the driven roller 43, the label formation base material pair LMP is delivered.

Figure 5:
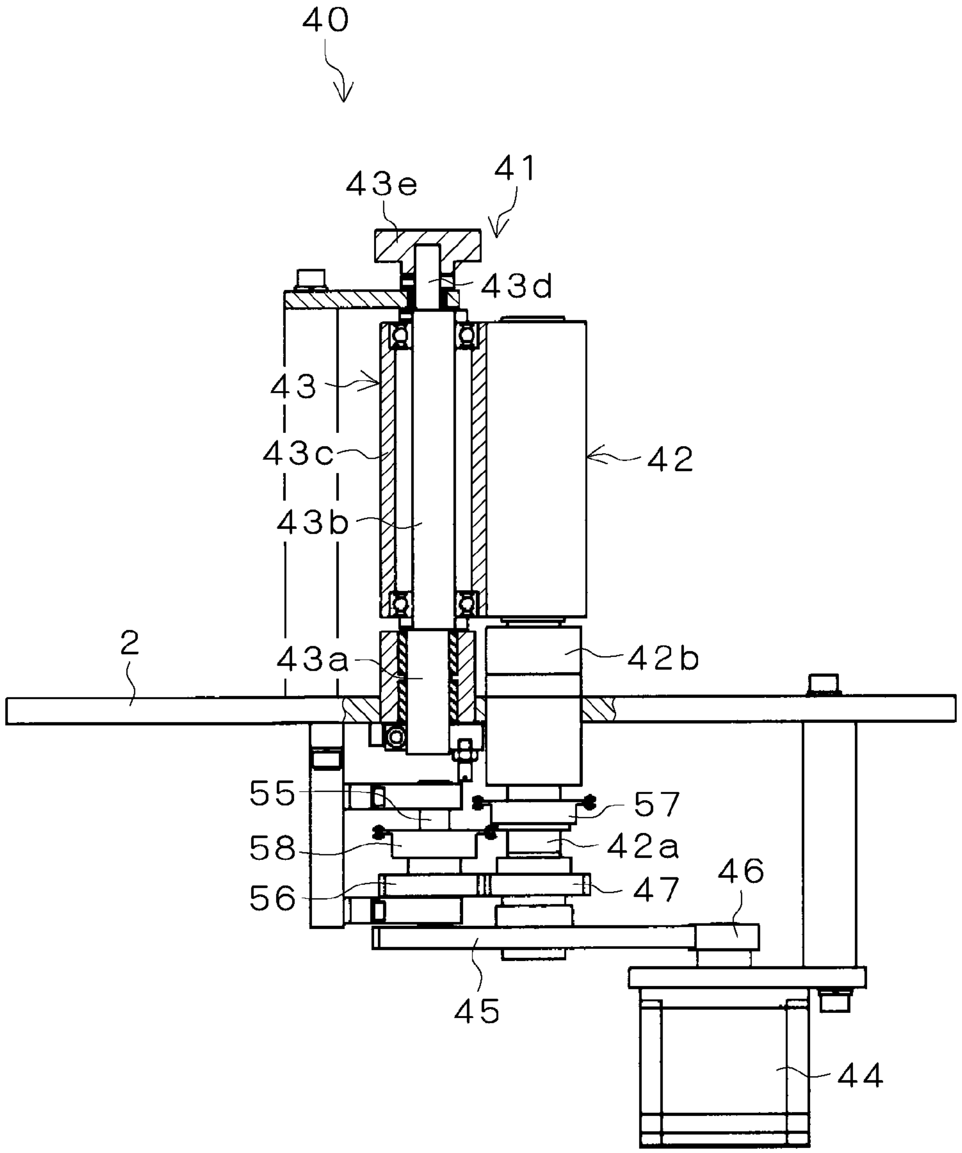
FIG. 5 is a partial vertical sectional view showing a part including a delivering unit in the same tack labeler.
Figure 6:
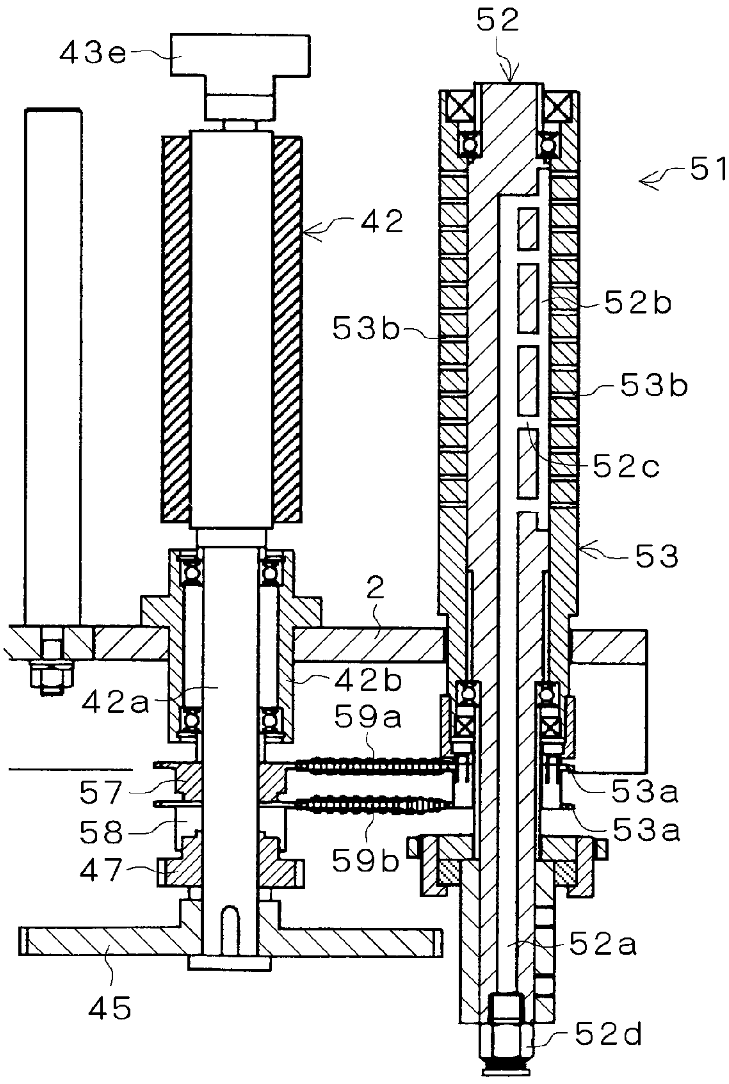
FIG. 6 is a vertical sectional view showing a part including the delivering unit and a separating-delivering unit in the same tack labeler.

As shown in FIGS. 5 and 6, in the driving roller 42, a center shaft **42*a* protruding on the lower side is rotatably supported on the base plate 2 via a bearing 42*b*. By meshing a gear 45 attached to the center shaft 42*a* of the driving roller 42 with a gear 46 attached to a drive shaft of the servomotor 44 each other, rotation drive force of the servomotor 44 is transmitted to the driving roller 42**.

As shown in FIG. 5, the driven roller 43 is provided with a lower shaft **43*a* rotatably supported on the base plate 2, a middle shaft 43*b* coupled to the lower shaft 43*a* in a state that the middle shaft is eccentric to a rotation center of the lower shaft 43*a*, a roller pipe 43*c* rotatably supported on the middle shaft 43*b* via bearings, an upper shaft 43*d* coupled to the middle shaft 43*b* so that a rotation center matches with the rotation center of the lower shaft 43*a*, and a knob 43*e* fixed to the upper shaft 43*d*. When the knob 43*e* is rotated in the direction shown by an arrow in FIG. 1, the roller pipe 43*c* is brought close to and away from the driving roller 42. Moreover, the roller pipe 43*c* is always biased by a coil spring (not shown) in the direction in which the roller pipe is brought close to the driving roller 42**.

For the delivering unit 40, the auxiliary control unit working together with the main control unit performs so-called pitch control of intermittently delivering a predetermined amount of the label formation base material pair LMP. In order to place positions where the tack labels are cut off from the separated label formation base materials LM to cut positions of the cut units 60, after the mark sensor 81 detects the marks printed on the label formation base material pair LMP, only a preliminarily fixed amount of the label formation base material pair LMP is delivered.

As shown in FIGS. 6 to 9, the separating-delivering unit 50 is provided with a pair of suction drive rollers 51, 51 installed on the both sides of the label formation base material pair LMP so as to nip the label formation base material pair LMP in a state that the suction drive rollers 51, 51 pass through the base plate 2, and suction plates 54, 54 respectively installed on the outer side of and adjacent to the suction drive rollers 51, 51. The suction drive rollers 51, 51 deliver the label formation base materials LM in the directions extending along the suction plates 54, 54 in which the label formation base materials LM are brought away from each other while suctioning and holding the respective separated label formation base materials LM onto outer circumferential surfaces, so that the two label formation base materials LM are continuously separated from the label formation base material pair LMP.

Figure 7:
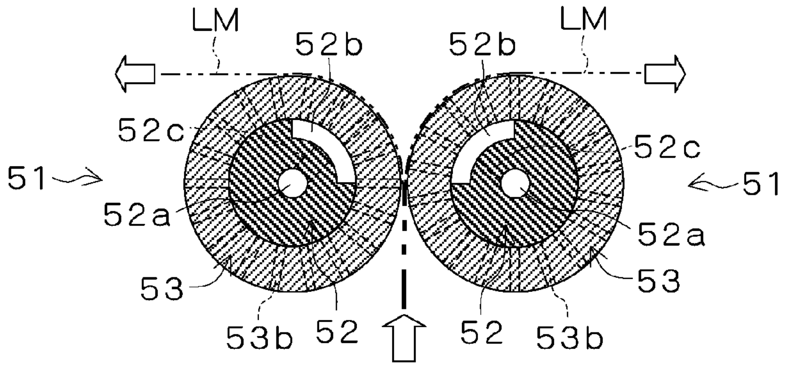
FIG. 7 is a cross sectional view showing suction drive rollers forming the same separating-delivering unit.

As shown in FIGS. 6 and 7, each of the suction drive rollers 51 is provided with a center shaft 52 fixed and installed onto the base plate 2, and a roller pipe 53 rotatably supported on the center shaft 52 via bearings, the roller pipe 53 having a lower end to which a sprocket 53*a* is attached. A large number of suction holes 53*b* with one ends opened on the inner circumferential surface side and the other ends opened on the outer circumferential surface side are formed in the roller pipe 53.

As shown in FIGS. 6 and 7, the center shaft 52 is provided with a main suction passage 52*a* extending in a center part in the vertical direction and having a closed upper end, a recess 52*b* formed on an outer circumferential surface ranging from a position where the roller pipes 52, 52 of a pair of the suction drive rollers 51 are brought the closest to each other to a position making 90° in the delivering direction of the label formation base materials LM, and five upper and lower communication passages 52*c* providing communication between the main suction passage 52*a* and the recess 52*b*. A connection plug 52*d* of a suction tube for connecting to a suction blower 82 via a pressure regulating valve is attached to a lower end in which the main suction passage 52*a* is opened. During operation of the tack labeler 1, a suction action of the suction drive rollers 51 is always executed.

As shown in FIG. 5, a power transmission shaft 55 extending in the vertical direction is rotatably supported on the lower side of the driven roller 43 of the delivering unit 40. A gear 56 to be meshed with a gear 47 which is attached to the center shaft 42*a* of the driving roller 42 is attached to the power transmission shaft 55. Sprockets 57, 58 are respectively attached to the center shaft 42*a* of the driving roller 42 and the power transmission shaft 55. Circular endless chains 59*a*, 59*b* are respectively hanged over these sprockets 57, 58 and the sprockets 53*a*, 53*a* attached to the roller pipes 53, 53 of the suction drive rollers 51, 51.

Therefore, when the driving roller 42 of the delivering unit 40 is rotated, the suction drive rollers 51, 51 of the separating-delivering unit 50 are similarly rotated. However, since circumferential speed of the suction drive rollers 51, 51 is set to be increased by approximately 20% more than circumferential speed of the driving roller 42, the label formation base material pair LMP is not slacked between the delivering unit 40 and the separating-delivering unit 50.

Figure 8:
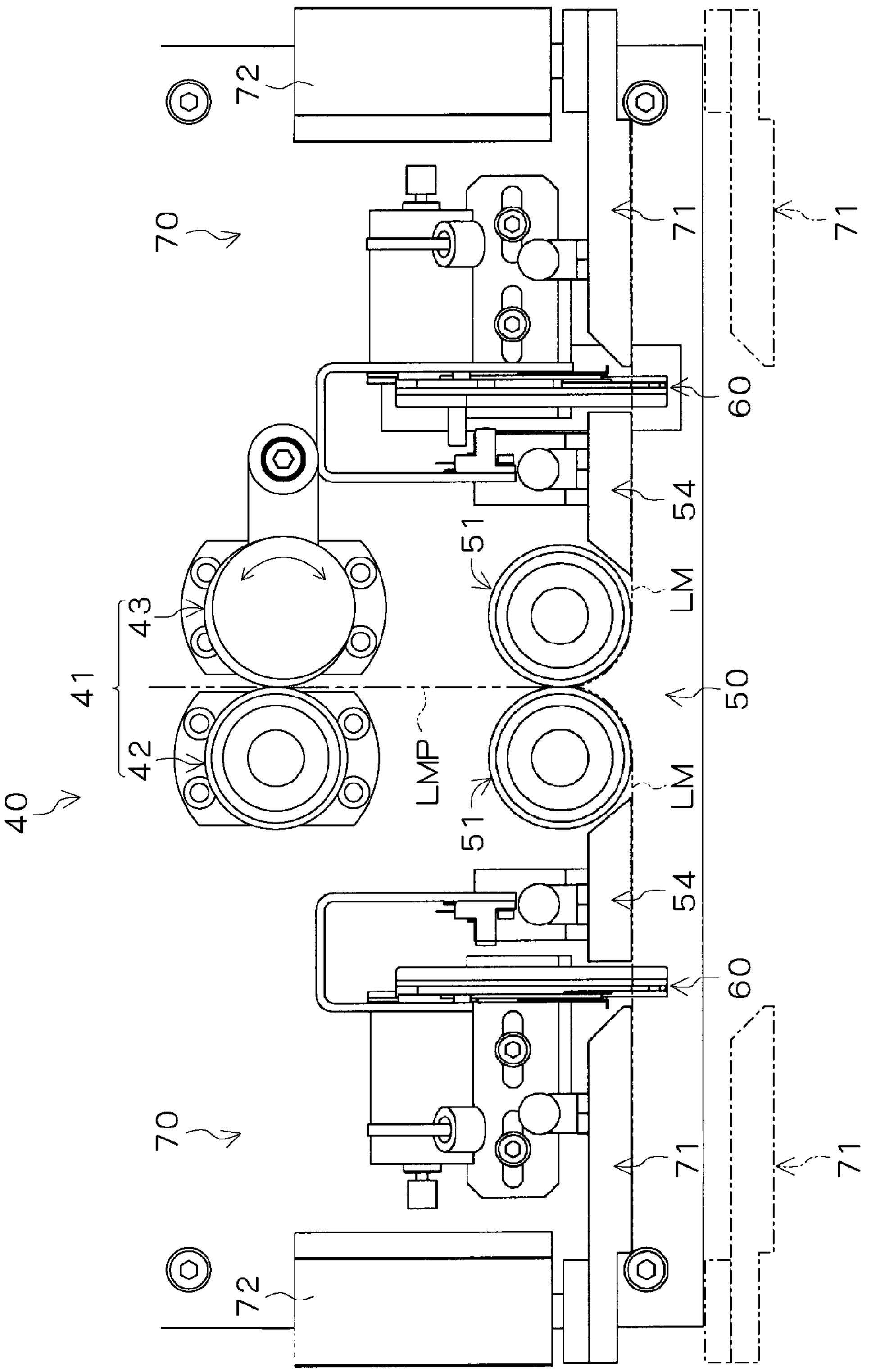
FIG. 8 is an enlarged plan view showing a part including the delivering unit, the separating-delivering unit, cut units, and adhering units in the same tack labeler.
Figure 9:
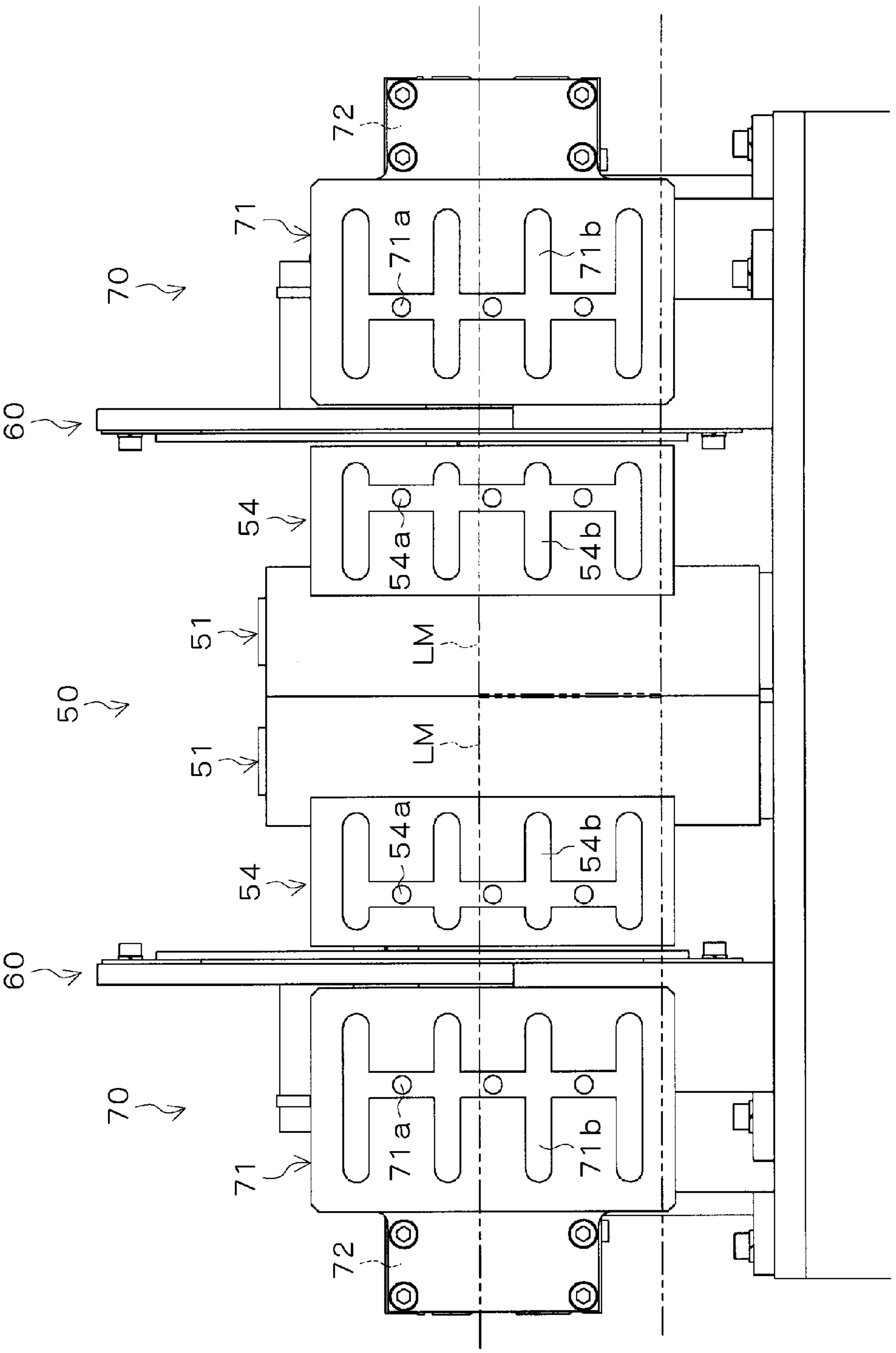
FIG. 9 is an enlarged front view showing a part including the separating-delivering unit, the cut units, and the adhering units in the same tack labeler.

As shown in FIGS. 8 and 9, each of the suction plates 54 has a front shape of vertically long rectangle, and a cross sectional shape of trapezoid. In order to place one tilted side surface along an outer circumferential surface of the suction drive roller 51, the suction plate is disposed in a state that a suction surface makes substantially 90° with a delivering line of the label formation base material pair LMP.

Three upper and lower suction holes 54*a* are opened and a comb shape suction groove 54*b* communicating with these suction holes 54*a* is formed on the suction surface of the suction plate 54. In order to make the label formation base material LM delivered by the suction drive roller 51 slide on the suction surface with a stiffness of the label formation base material LM, weak suction force is applied to the label formation base material LM passing through the suction surface of the suction plate 54.

As well as the main suction passage 52*a* of the suction drive roller 51, the suction holes 54*a* of the suction plate 54 are connected to the suction blower 82 via a pressure regulating valve, and during operation of the tack labeler 1, a suction action is always executed.

As shown in FIGS. 8 and 9, each of the adhering units 70 is provided with a suction plate 71 for suctioning and holding the label formation base material LM at the time of cutting by the cut unit 60 and the tack label cut off from the label formation base material LM, and a drive cylinder 72 for moving the suction plate 71 in the front and back direction. When the suction plate 71 suctioning and holding the tack label is moved forward by the drive cylinder 72, the tack label is adhered to the trunk portion of the container C conveyed to the adhering position by a container conveyance unit.

As well as the suction plate 54 of the separating-delivering unit 50, three upper and lower suction holes 71*a* are opened and a comb shape suction groove 71*b* communicating with these suction holes 71*a* is formed on a suction and holding surface of the suction plate 71. In order to reliably suction and hold the label formation base material LM before cutting and the tack label after cutting onto the suction plate 71, stronger suction force than the suction plate 54 of the separating-delivering unit 50 is applied to the label formation base material LM and the tack label.

The suction holes 71*a* of the suction plate 71 are connected to the suction blower 82 via a vacuum valve 83 with the air serving as a drive source. The control unit (not shown) operates an air valve 84 and hence controls supply of the air for driving the vacuum valve 83 so as to open or close the vacuum valve 83, and thereby a suction action by the suction plate 71 is intermittently performed as described below.

When the label formation base material LM is brought to the suction plate 71 in passing from the separating-delivering unit 50 through the cut unit 60, the suction action by the suction plate 71 is stopped. When an end of the label formation base material LM is brought to a predetermined position, the suction action is started. In a state that the label formation base material LM is reliably suctioned and held, the label formation base material is cut by the cut unit 60.

In such a way, after the tack label is cut off from the label formation base material LM, the suction action is continued. However, at a time point when the suction plate 71 suctioning and holding the tack label is moved forward and the tack label is adhered to the container C, the suction action is stopped, and the suction plate 71 is moved backward to an initial position.

As described above, in the tack labeler 1, when the suction drive rollers 51 are rotated in a state that a beginning end of the label formation base material pair LMP delivered by the delivering unit 40 is preliminarily detached and then suctioned and held onto the outer circumferential surfaces of the suction drive rollers 51 of the separating-delivering unit 50, the two label formation base materials LM pasted to each other are continuously separated. Thus, the respective separated label formation base materials LM are successively cut by the cut units 60 so as to form the individual tack labels, and these tack labels are reliably adhered to the trunk portions of the containers C by the adhering units 70.

Figure 10:
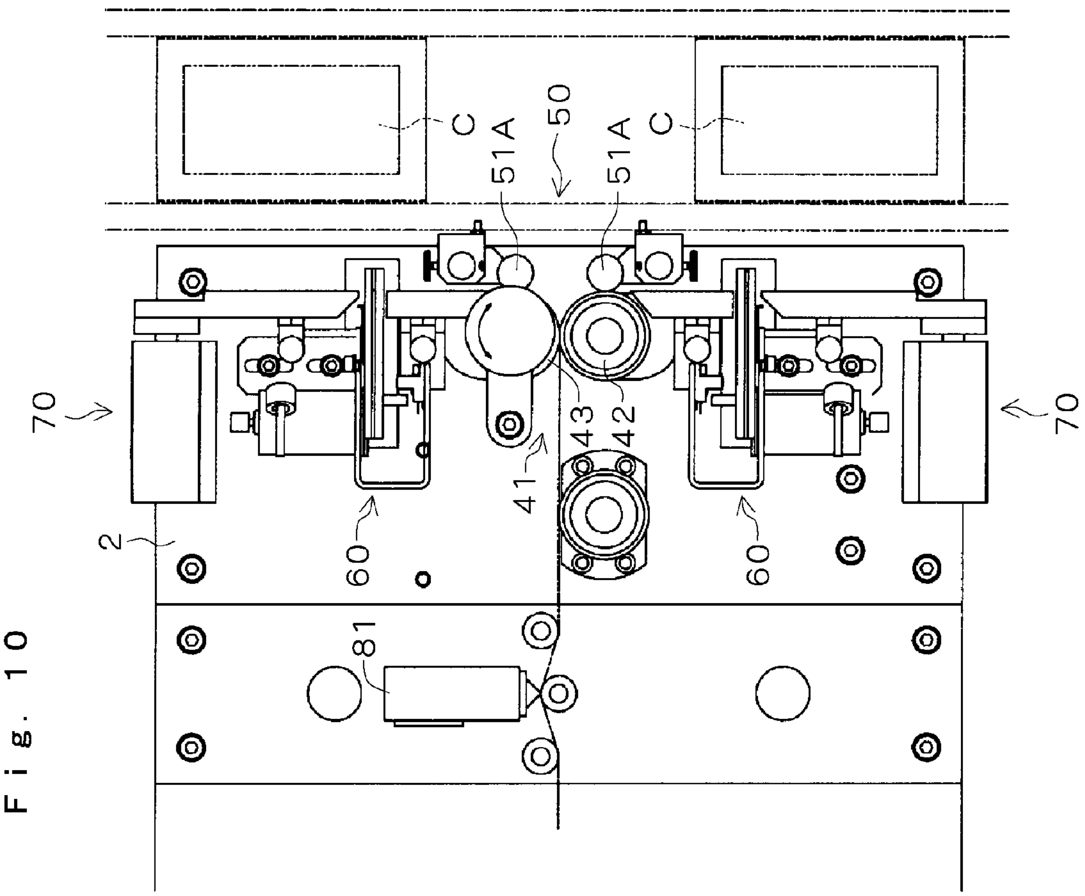
FIG. 10 is a partial plan view showing a tack labeler according to one of the other embodiments.
Figure 11:
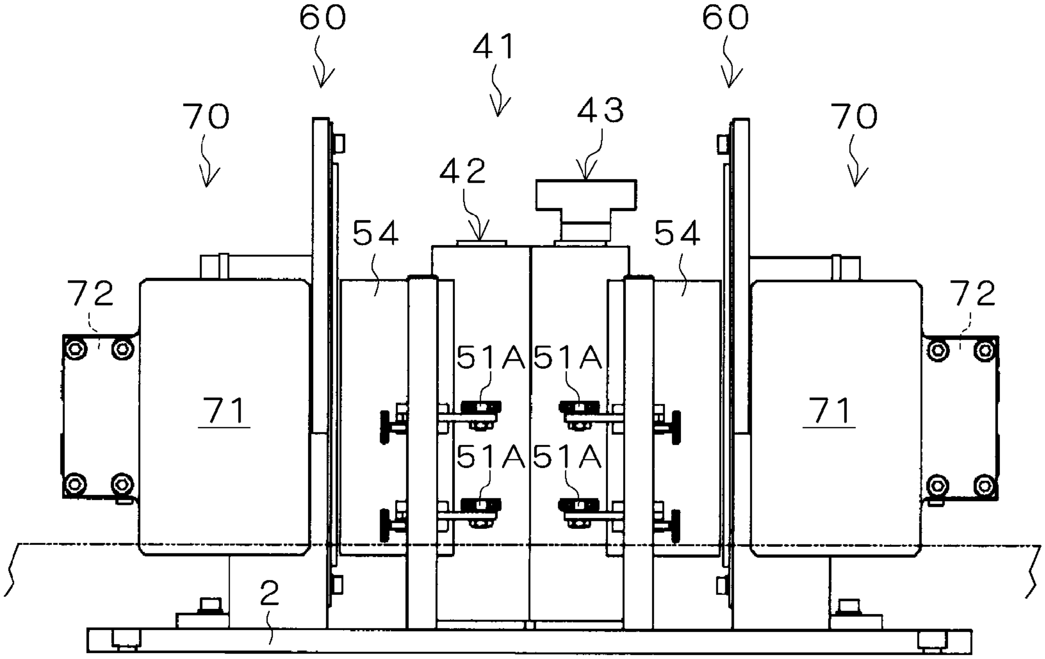
FIG. 11 is a partial front view showing the same tack labeler.

In the above tack labeler 1, by rotating the suction drive rollers 51 in the state that the beginning end of the label formation base material pair LMP delivered by the delivering unit 40 is preliminarily detached and then suctioned and held onto the outer circumferential surfaces of the suction drive rollers 51 of the separating-delivering unit 50, the two label formation base materials LM pasted to each other are continuously separated. However, the tack labeler is not limited to this. For example, as a tack labeler shown in FIGS. 10 and 11, instead of the suction drive rollers 51, 51 of the tack labeler 1, the nip roller 41 including the driving roller 42 and the driven roller 43 may be provided at a position of the suction drive rollers 51, 51, and auxiliary rollers 51A, 51A for respectively nipping the label formation base materials LM with the rotating driving roller 42 and the driven roller 43 may be provided. By the driving roller 42 and the auxiliary roller 51A, and the driven roller 43 and the auxiliary roller 51A, the respective separated label formation base materials LM may be delivered in the directions extending along the suction plates 54, 54.

Figure 12:
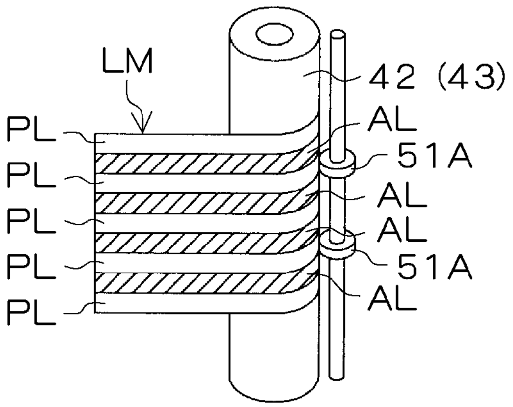
FIG. 12 is an illustrative view for illustrating auxiliary rollers forming a separating-delivering unit of the same tack labeler.

As shown in the same figures, the auxiliary rollers 51A brought into contact with the adhering surface side of the label formation base materials LM are disposed into two upper and lower stages with adjustable height positions, and formed into disc shapes with height smaller than width of the non-adhesive layers PL of the label formation base materials LM. As shown in FIG. 12, the auxiliary rollers are installed at the height positions corresponding to the non-adhesive layers PL so as not to be brought into contact with the adhesive layers AL on adhering surfaces of the label formation base materials LM.

Therefore, adhesives forming the adhesive layers AL are not stuck onto the auxiliary rollers 51A, and the label formation base materials LM can be smoothly delivered.

The above embodiments are to describe the tack labeler having the separating-delivering unit for delivering the label formation base materials LM in the directions in which the label formation base materials are brought away from each other while suctioning and holding the label formation base materials LM onto the outer circumferential surfaces of the suction drive rollers 51, 51, or the separating-delivering unit for nipping the label formation base materials LM between the driving roller 42 and the driven roller 43 forming the nip roller 41 and having no suction function and the auxiliary rollers 51A, 51A and delivering the label formation base materials LM in the directions in which the label formation base materials are brought away from each other. However, the tack labeler is not limited to this. For example, instead of the suction drive rollers 51, 51 of the tack labeler 1, normal drive rollers having no suction function may be installed and auxiliary rollers for respectively nipping the label formation base materials with these drive rollers may be provided, or auxiliary rollers for respectively nipping the label formation base materials with the suction drive rollers may be provided.

FIGS. 15 to 22 show the other embodiments. Since the tack labeler 1A has the basically same configurations as the above tack labeler 1, the same reference numerals are given to the same constituent elements, description thereof will be omitted, and different constituent elements will be described in detail.

The above tack labeler 1 is provided with the delivering unit 40 for bringing out and delivering the label formation base material pair LMP from the base material pair accumulation unit 30. However, the tack labeler 1A is not provided with such an independent delivering unit but a separating-delivering unit 50A for separating the label formation base material pair LMP into the label formation base materials LM and delivering the label formation base materials LM has both functions of the delivering unit 40 and the separating-delivering unit 50 of the tack labeler 1. Therefore, in the tack labeler 1A, the auxiliary control unit working together with the main control unit controls a delivering action of the label formation base material pair LMP by the separating-delivering unit 50A and performs the so-called pitch control of intermittently delivering only a predetermined amount of the label formation base material pair LMP by the separating-delivering unit 50A.

Figure 18:
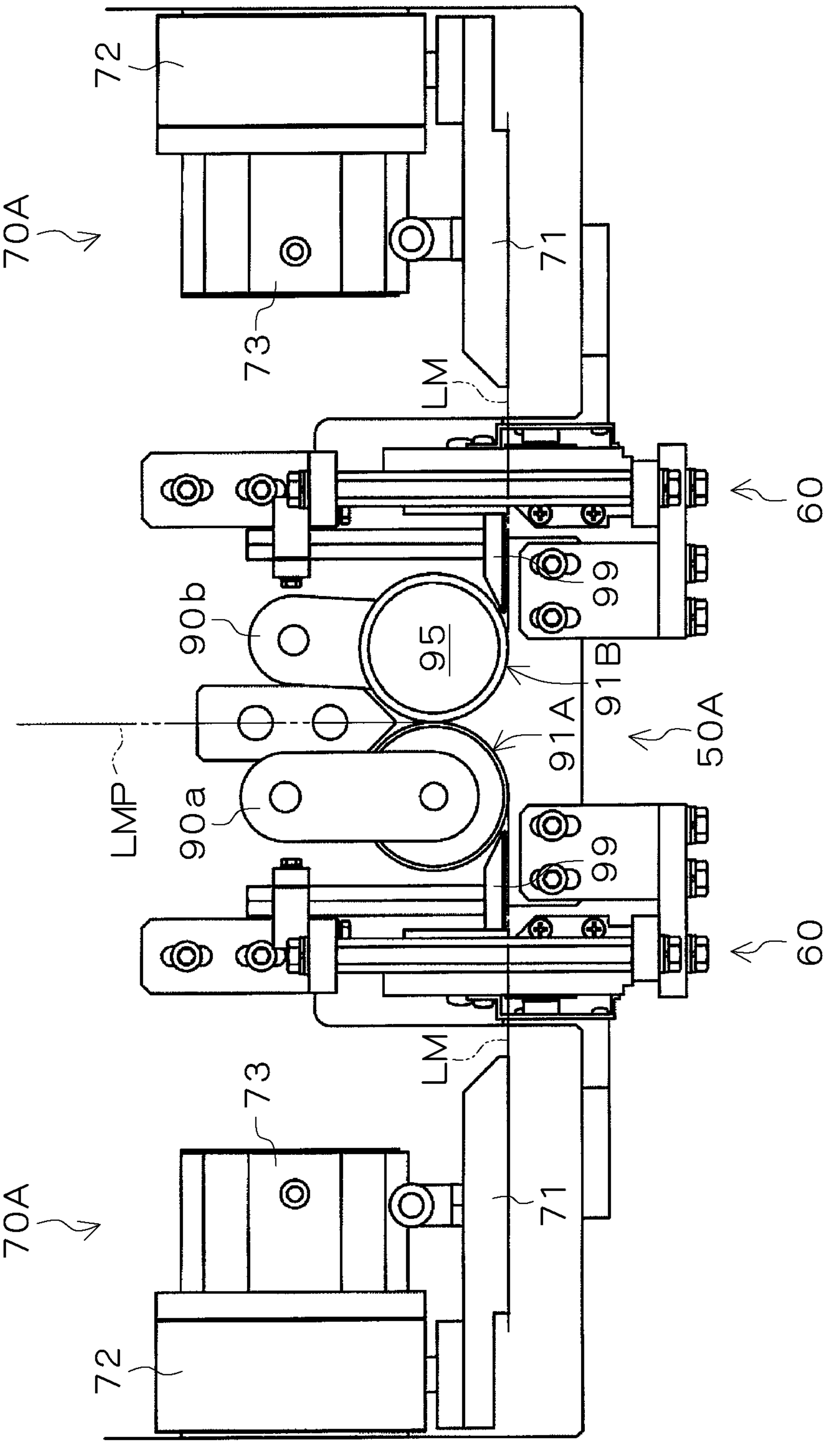
FIG. 18 is an enlarged plan view showing a part including a separating-delivering unit, cut units, and adhering units in the same tack labeler.
Figure 19A:
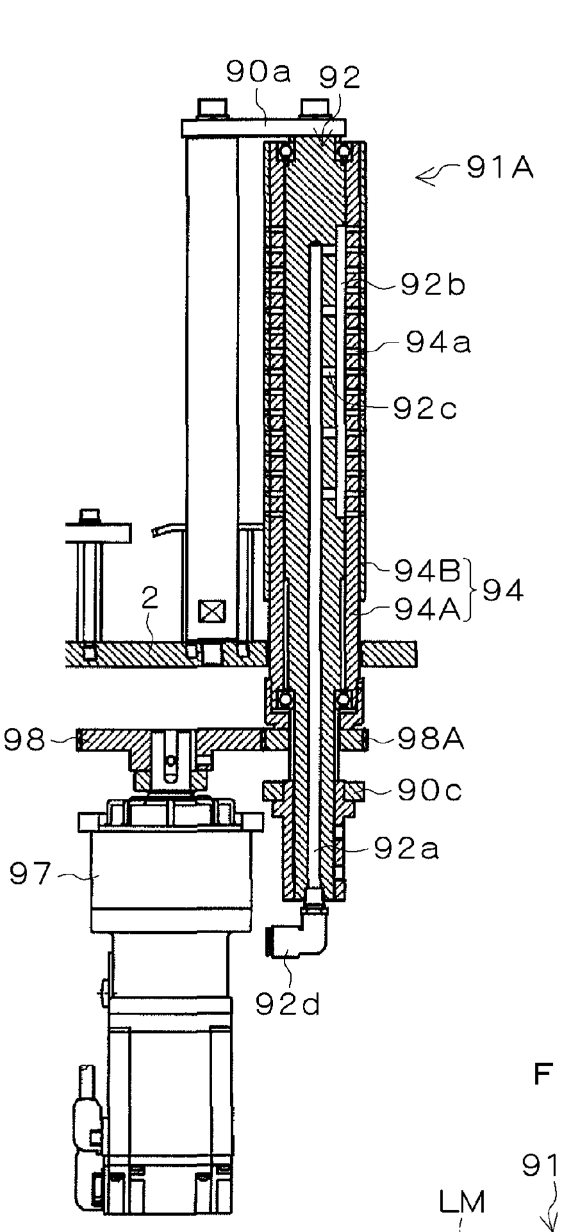
FIGS. 19 A and 19 B are vertical sectional views showing a part including the separating-delivering unit in the same tack labeler, and FIG. 19 C is a cross sectional view showing suction drive rollers forming the same separating-delivering unit.
Figure 19B:
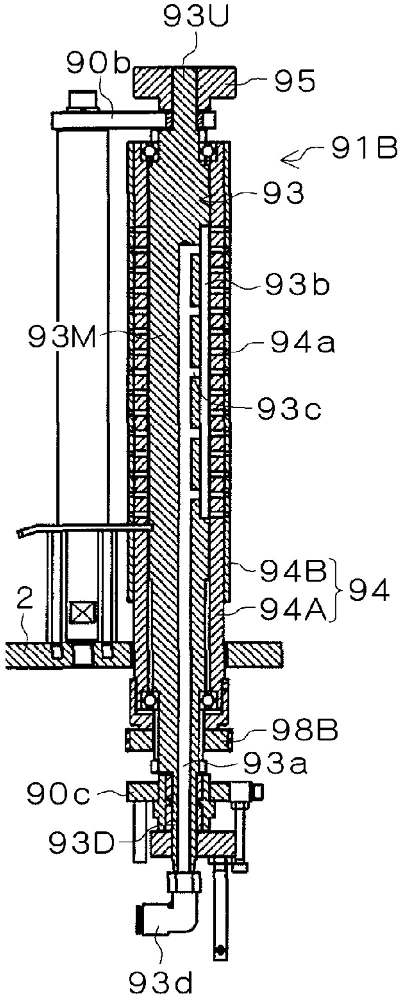
Figure 19C:
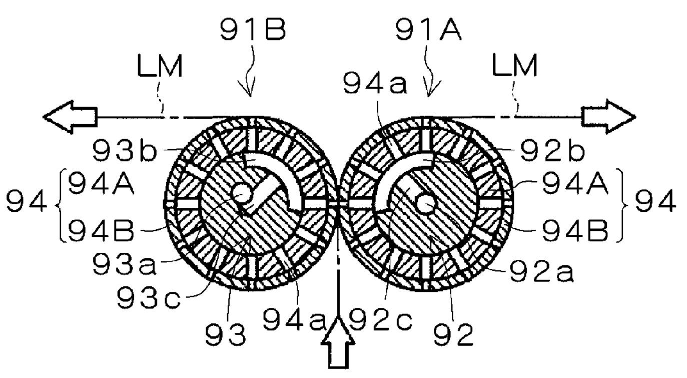
Figure 20A:
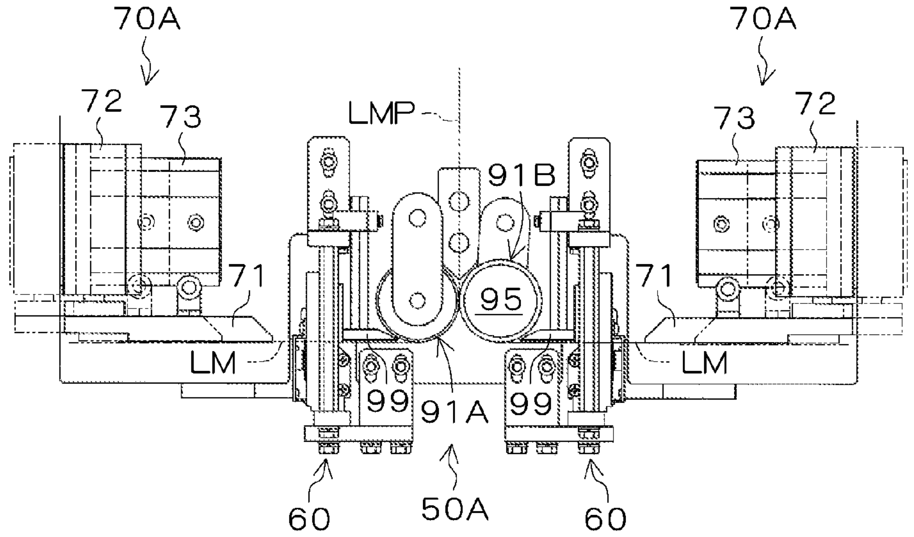
FIG. 20 A is a plan view showing a state immediately before cutting in the same separating-delivering unit, the cut units, and the adhering units, and FIG. 20 B is a front view showing the state immediately before cutting in the same separating-delivering unit, the cut units, and the adhering units.
Figure 20B:
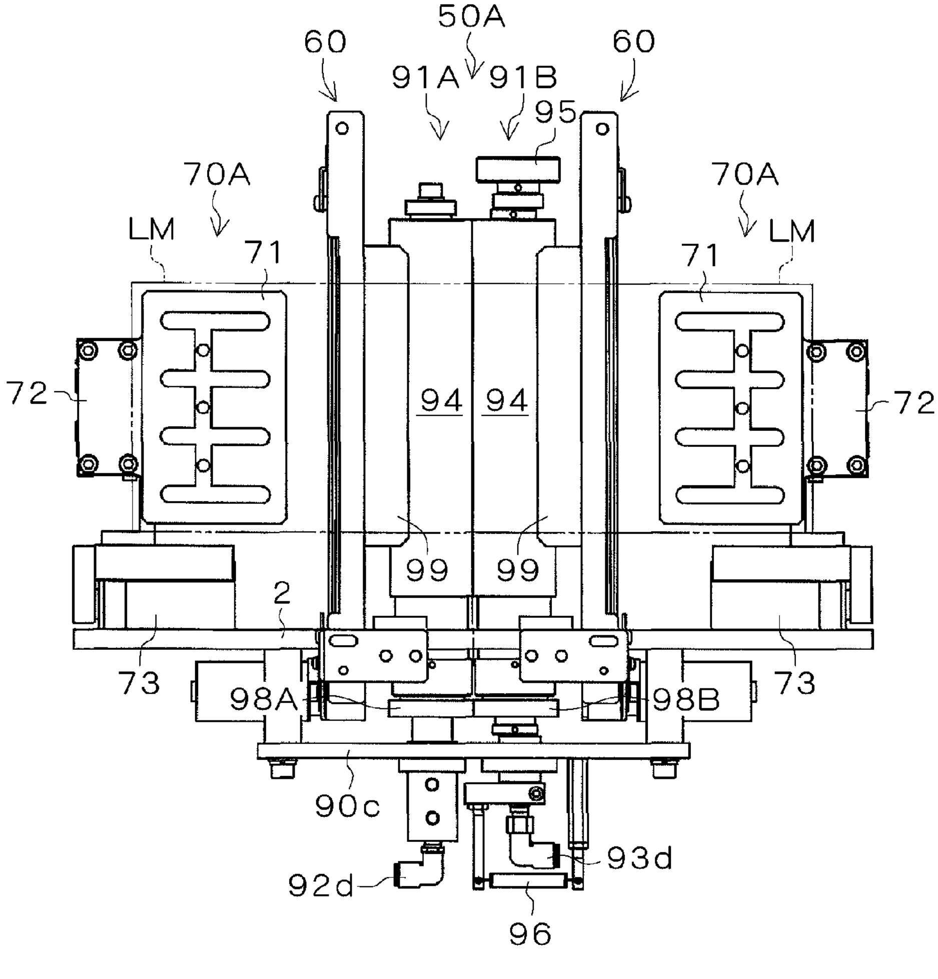

As shown in FIGS. 18 to 20, the separating-delivering unit 50A is provided with a pair of suction drive rollers 91A, 91B respectively installed on the both sides of the label formation base material pair LMP so as to nip the label formation base material pair LMP in a state that the suction drive rollers pass through the base plate 2, a servomotor 97 for rotating the one suction drive roller 91A, and guide plates 99, 99 respectively installed on the outer side of and adjacent to the suction drive rollers 91A, 91B. When the respective separated label formation base materials LM are delivered in the directions extending along the guide plates 99, 99 so as to be brought away from each other, the two label formation base materials LM are continuously separated from the label formation base material pair LMP. In the above tack labeler 1, in order to reliably guide the separated label formation base materials LM, the suction plates 54, 54 are respectively installed on the outer side of the suction drive rollers 51, 51. However, in the tack labeler 1A, instead of the suction plates 54, 54, the simple guide plates 99, 99 having no suction function are installed. These guide plates 99, 99 have narrower width than the suction plates 54, 54 of the tack labeler 1. Thus, even when the separated label formation base materials LM are not particularly suctioned, the label formation base materials can be reliably guided.

As shown in FIGS. 18, 19 A and 19 C, the one suction drive roller 91A is provided with a center shaft 92 passing through the base plate 2, and a roller pipe 94 rotatably supported on the center shaft 92 via bearings, the roller pipe 94 having a large number of suction holes 94*a* with one ends opened on the inner circumferential surface side and the other ends opened on the outer circumferential surface side. The center shaft 92 has an upper end fixed to the other end of a support piece 90*a* with one end supported on a support which is stood on the base plate 2 on the upper side of the base plate 2, and a lower end fixed to a flat bar 90*c* with both ends attached to the base plate 2 via a support on the lower side of the base plate 2.

As shown in FIG. 19 A, the center shaft 92 is provided with a main suction passage 92*a* extending in a center part in the vertical direction and having a closed upper end, a recess 92*b* formed on an outer circumferential surface ranging from a position where the roller pipes 94, 94 of a pair of the suction drive rollers 91A, 91B are brought the closest to each other to a position making 90° in the delivering direction of the label formation base materials LM, and five upper and lower communication passages 92*c* providing communication between the main suction passage 92*a* and the recess 92*b*. A connection elbow 92*d* of a suction tube for connecting to the suction blower 82 via a pressure regulating valve is attached to a lower end of the center shaft 92 in which the main suction passage 92*a* is opened.

As shown in FIGS. 18, 19 B and 19 C, the other suction drive roller 91B is also provided with a center shaft 93 passing through the base plate 2, and a roller pipe 94 rotatably supported on the center shaft 93 via bearings, the roller pipe 94 having a large number of suction holes 94*a* with one ends opened on the inner circumferential surface side and the other ends opened on the outer circumferential surface side. However, the center shaft 93 has an upper end rotatably supported on the other end of a support piece 90*b* with one end supported on a support which is stood on the base plate 2 on the upper side of the base plate 2, and a lower end rotatably supported on the flat bar 90*c* on the lower side of the base plate 2.

Figure 17:
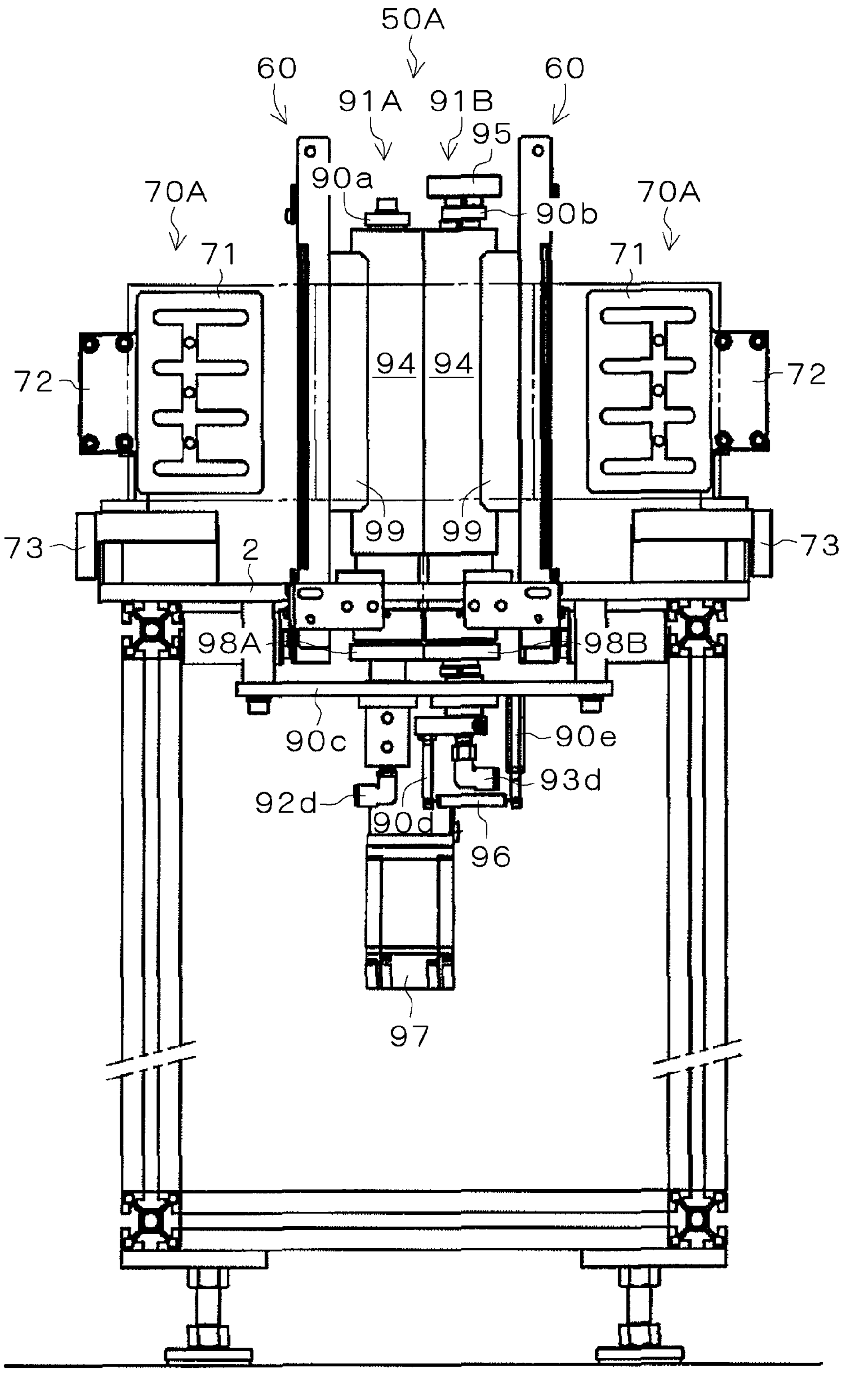
FIG. 17 is a front view showing the same tack labeler.

As shown in FIGS. 17 and 19 B, the center shaft 93 is provided with a lower shaft 93D rotatably supported on the flat bar 90*c*, a middle shaft 93M installed continuously to the lower shaft 93D in a state that the middle shaft 93M is eccentric to a rotation center of the lower shaft 93D, an upper shaft 93U installed continuously to the middle shaft 93M so that a rotation center matches with the rotation center of the lower shaft 93D, a knob 95 fixed to the upper shaft 93U, and a coil spring 96 with one end coupled to a support member 90*d* which is attached to the lower shaft 93D and the other end coupled to a support member 90*e* which is attached to the flat bar 90*c*. By rotating the knob 95, the roller pipe 94 rotatably supported on the middle shaft 93M is brought close to and away from the roller pipe 94 of the one suction drive roller 91A. Moreover, the middle shaft 93M (the roller pipe 94) is always biased by the coil spring 96 in the direction in which the middle shaft is brought close to the roller pipe 94 of the one suction drive roller 91A. Therefore, at the time of setting the label formation base material pair LMP, after the label formation base material pair LMP is inserted between both the roller pipes 94, 94 in a state that the roller pipe 94 of the other suction drive roller 91B is brought away from the roller pipe 94 of the one suction drive roller 91A by rotating the knob 95, when the knob 95 is released, the roller pipe 94 of the other suction drive roller 91B is returned to an original position by bias force of the coil spring 96. Thus, the label formation base material pair LMP is nipped between the roller pipes 94, 94 of a pair of the suction drive rollers 91A, 91B.

As well as the center shaft 92 of the one suction drive roller 91A, the center shaft 93 of the suction drive roller 91B is also provided with a main suction passage 93*a* extending in a center part in the vertical direction and having a closed upper end, a recess 93*b* formed on an outer circumferential surface of the middle shaft 93M ranging from a position where the roller pipes 94, 94 of a pair of the suction drive rollers 91A, 91B are brought the closest to each other to a position making 90° in the delivering direction of the label formation base materials LM, and five upper and lower communication passages 93*c* providing communication between the main suction passage 93*a* and the recess 93*b*. A connection elbow 93*d* of a suction tube for connecting to the suction blower 82 via a pressure regulating valve is attached to a lower end of the center shaft 93 in which the main suction passage 93*a* is opened.

Each of the roller pipes 94 forming the suction drive rollers 91A, 91B includes a main body portion 94A made of aluminum, and a cover portion 94B made of urethane rubber covering an outer circumferential surface of the main body portion 94A in order to prevent the label formation base material pair LMP to be nipped and delivered or the two label formation base materials LM separated from the label formation base material pair LMP from sliding. Suction holes 94*a* are formed on both the main body portion 94A and the cover portion 94B.

Gears 98A, 98B rotated with the respective roller pipes 94, 94 and meshed with each other are respectively attached to a pair of the suction drive rollers 91A, 91B. By meshing the gear 98A of the one suction drive roller 91A with a gear 98 attached to a drive shaft of the servomotor 97, rotation drive force of the servomotor 97 is transmitted to a pair of the suction drive rollers 91A, 91B, and a pair of the suction drive rollers 91A, 91B is reversely rotated.

In the above tack labeler 1, the suction plates 71 of the adhering units 70 are only moved forward and backward relative to the containers C. However, in the tack labeler 1A, adhering units 70A are provided with not only the drive cylinders 72 for moving the suction plates 71 forward and backward relative to the containers C but also separate drive cylinders 73 for bringing the suction plates 71 close to and away from the cut units 60.

In the tack labeler 1A, after the two label formation base materials LM delivered by the separating-delivering unit 50A are cut by the cut units 60, different actions from the above tack labeler 1 are performed. Hereinafter, the actions of the tack labeler 1A to be controlled by the main control unit and the auxiliary control unit will be described with reference to a timing chart shown in FIG. 22. The servomotor 97 of the separating-delivering unit 50A is controlled by the auxiliary control unit, and the cut units 60 and the drive cylinders 72, 73 of the adhering units 70 are controlled by the main control unit.

Firstly, the drive shaft of the servomotor 97 is rotated forward, and thereby the roller pipes 94, 94 of a pair of the suction drive rollers 91A, 91B nipping the label formation base material pair LMP are rotated. Then, as shown in FIGS. 20 A and 20 B, after edges (cut ends) of the label formation base materials LM are delivered to predetermined positions while separating the label formation base material pair LMP into the two label formation base materials LM, the servomotor 97 is stopped (T1).

Next, the suction action by the suction plates 71 is started. Then, in a state that the label formation base materials LM are suctioned and held onto the suction plates 71, movable blades of the cut units 60 move forward and backward and cut the label formation base materials LM (T1, T2 to T3), so that individual tack labels TL are formed in a state that the tack labels are suctioned and held onto the suction plates 71.

Figure 21A:
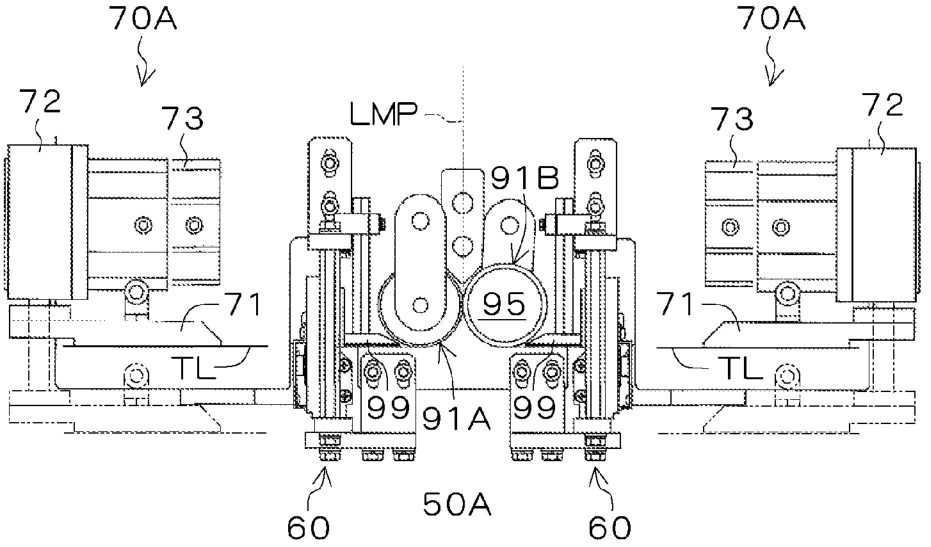
FIG. 21 A is a plan view showing a state after cutting (a state that suction plates are brought away from the cut units) in the same separating-delivering unit, the cut units, and the adhering units, and FIG. 21 B is a front view showing the state after cutting (the state that the suction plates are brought away from the cut units) in the same separating-delivering unit, the cut units, and the adhering units.
Figure 21B:
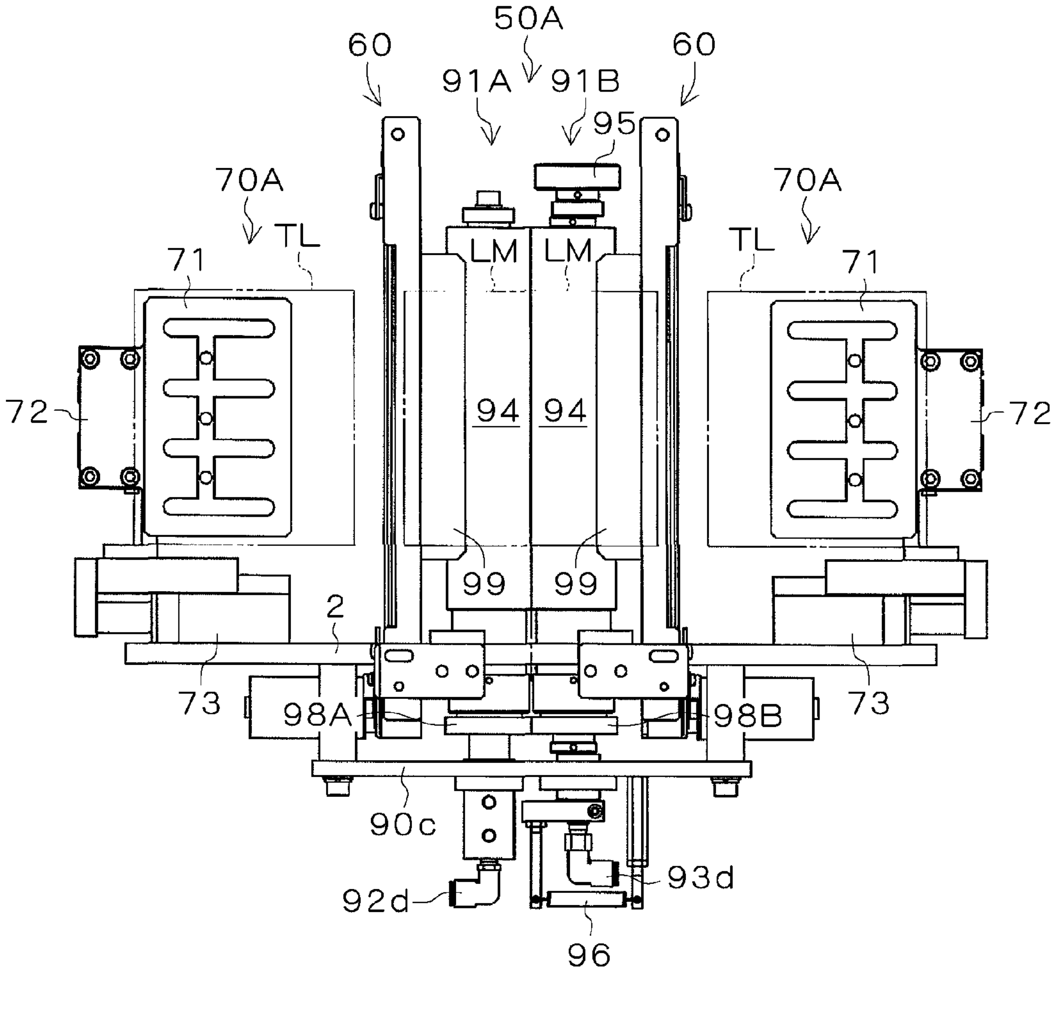
Figure 22:
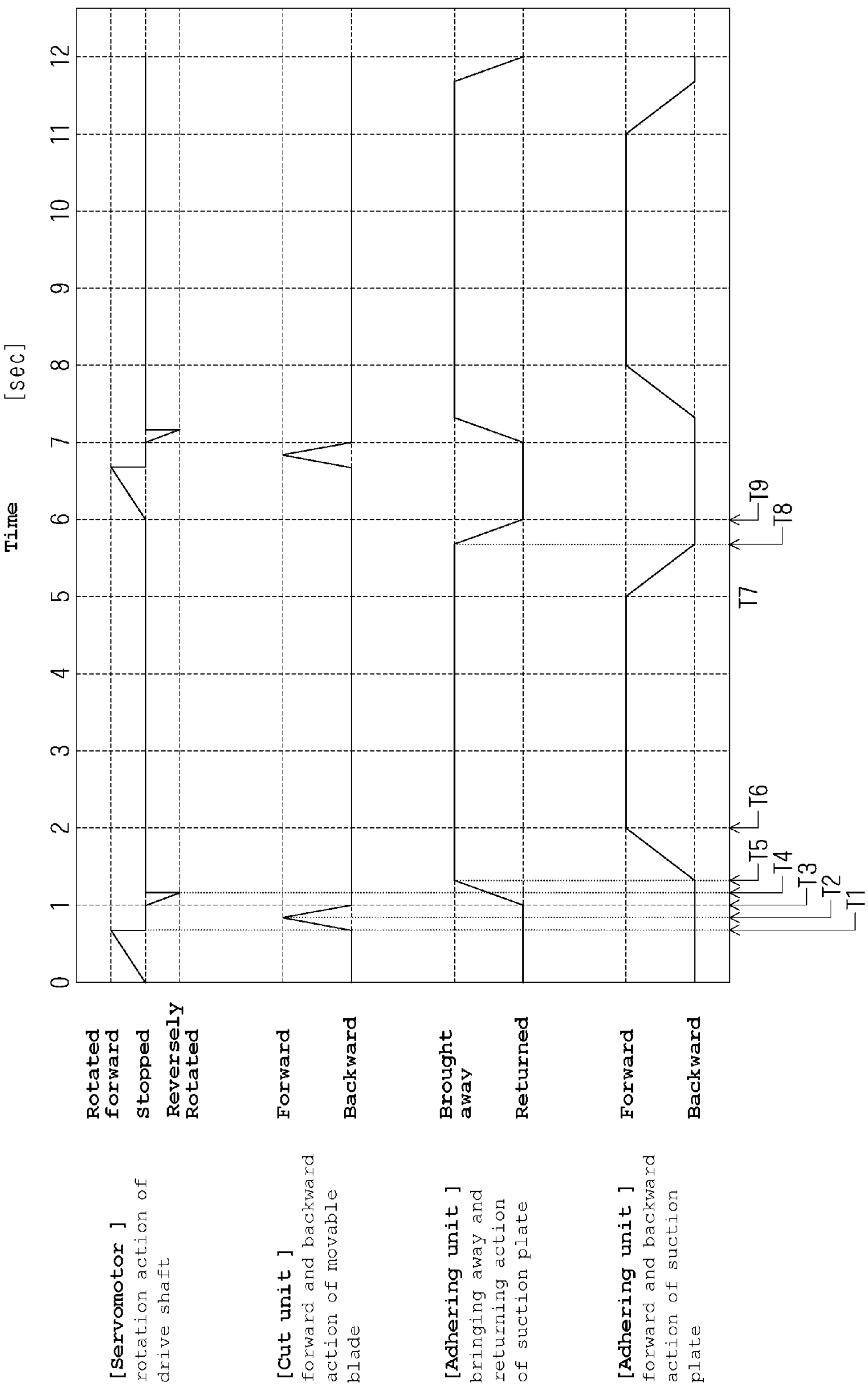
FIG. 22 is a timing chart for illustrating actions of the same separating-delivering unit, the cut units, and the adhering units.

After the label formation base materials LM are cut by the cut units 60 in such a way, as shown by double-dotted lines in FIG. 20 A, the drive cylinders 73 of the adhering units 70 are actuated and the suction plates 71 are brought away from the cut units 60 (T5) so as to bring the tack labels TL suctioned and held onto the suction plates 71 slightly away from the cut blades of the cut units 60 (refer to FIGS. 21 A, 21 B). Moreover, after the servomotor 97 is started to be reversely rotated (T3), the roller pipes 94, 94 of a pair of the suction drive rollers 91A, 91B are reversely rotated and the label formation base materials LM are slightly pulled back so as to bring the cut ends of the label formation base materials LM slightly away from the cut blades of the cut units 60 (refer to FIGS. 21 A, 21 B), and then the servomotor 97 is stopped (T4).

In the case where the suction plates 71 are brought away from the cut units 60 in such a way, as shown by double-dotted lines in FIG. 21 A, the drive cylinders 72 of the adhering units 70 are actuated and the suction plates 71 onto which the tack labels TL are suctioned and held are moved forward to the side of the containers C serving as articles to be adhered so as to adhere the tack labels TL to the trunk portions of the containers C (T6).

Then, after predetermined time (three seconds in the tack labeler 1A) passes (T7), the suction plates 71 are brought away from the containers C and moved backward to original positions (positions shown by solid lines in FIG. 21 A (T8), and then the suction plates 71 are started to be moved to the side of the cut units 60 and returned to original positions (positions shown by solid lines in FIGS. 20 A, 20 B) (T9). After this, the above actions are repeated.

As described above, in the tack labeler 1A, in the case where the tack labels are cut off from the label formation base materials LM by the cut units 60, the roller pipes 94, 94 of a pair of the suction drive rollers 91A, 91B are reversely rotated, thereby temporarily bringing the cut ends of the label formation base materials LM away from the cut blades of the cut units 60. Thus, the cut ends of the label formation base materials LM are not stuck onto the cut blades of the cut units 60, and the label formation base materials can be smoothly and reliably delivered to predetermined positions.

In the tack labeler 1A, the suction plates 71 suctioning and holding the tack labels cut off from the label formation base materials LM by the cut units 60 are moved forward to the side of the articles to be adhered in a state that the suction plates are brought away from the cut blades of the cut units 60, thereby adhering the tack labels to the articles to be adhered. Thus, at the time of moving the suction plates 71 forward to the side of the articles to be adhered, circumferential edges of the tack labels are not brought into contact with and stuck onto the cut blades of the cut units 60. Therefore, the tack labels suctioned and held onto the suction plates 71 are neither displaced nor dropped off from the suction heads, and the tack labels can be reliably adhered to predetermined positions of the articles to be adhered.

Figure 23:
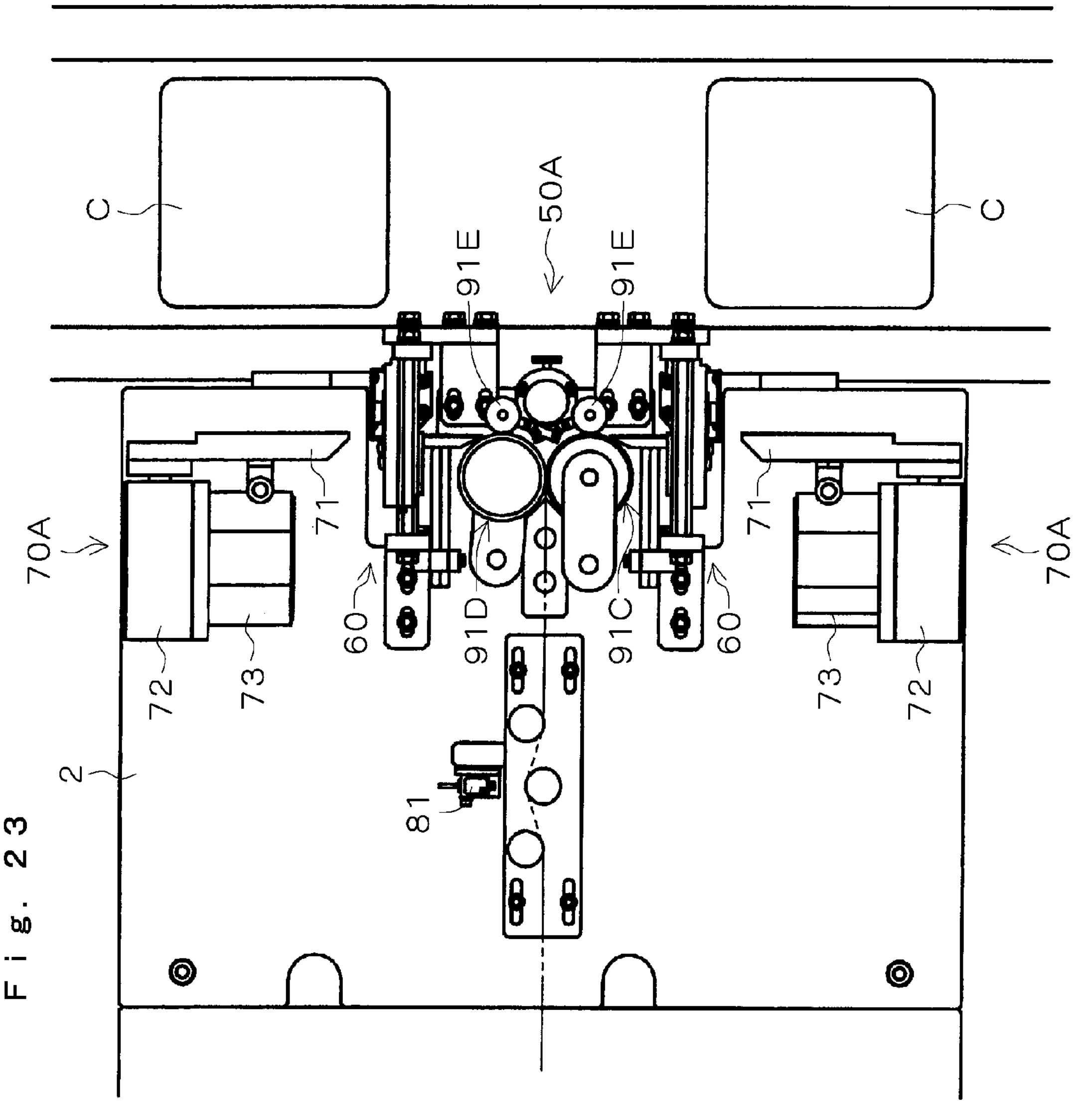
FIG. 23 is a partial plan view showing a tack labeler according to one of the other embodiments.
Figure 24:
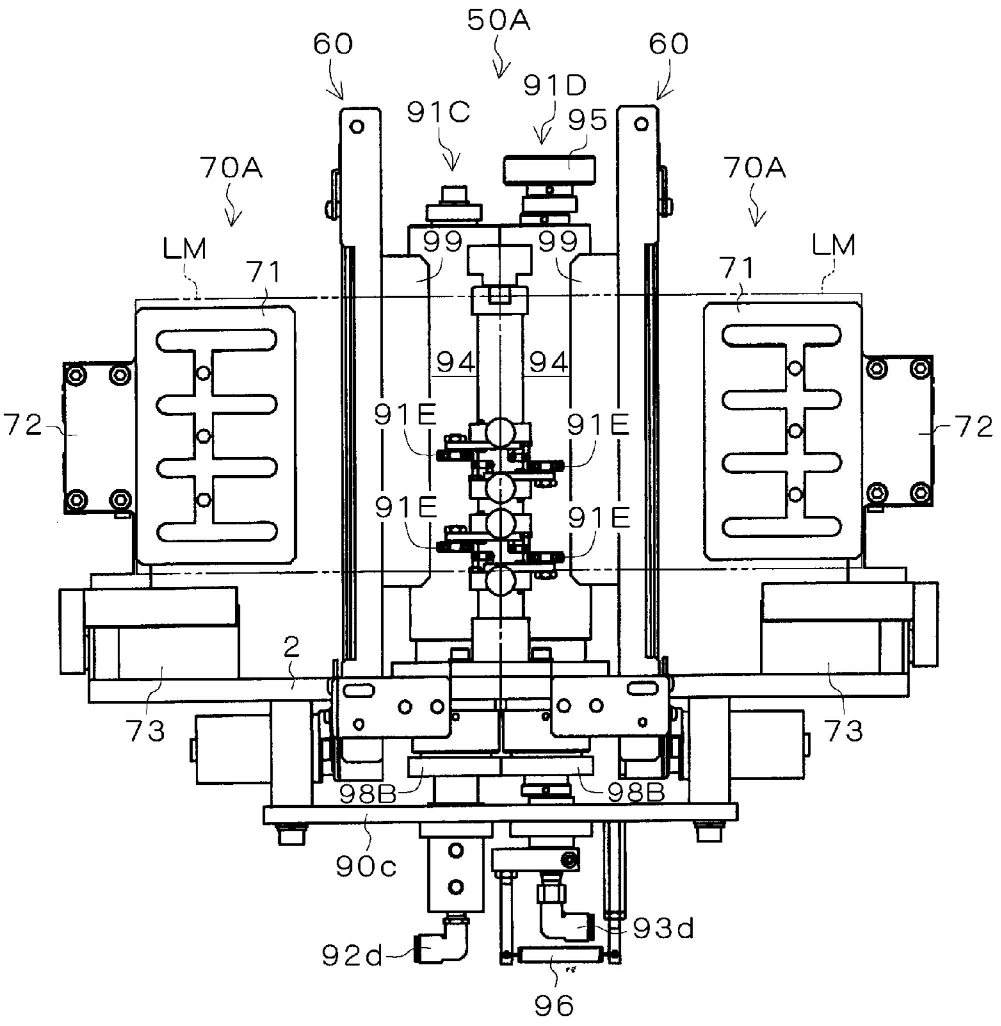
FIG. 24 is a front view showing the same tack labeler.

In the above tack labeler 1A, the separating-delivering unit 50A for delivering the label formation base materials LM in the directions in which the label formation base materials LM are brought away from each other while suctioning and holding the label formation base materials LM onto the outer circumferential surfaces of the suction drive rollers 91A, 91B is described. However, the tack labeler is not limited to this. For example, as a tack labeler shown in FIGS. 23 and 24, instead of the suction drive rollers 91A, 91B of the tack labeler 1A, drive rollers 91C, 91D having the same configurations except for having no suction function may be provided, and auxiliary rollers 91E, 91E for respectively nipping the label formation base materials LM with the rotating drive rollers 91C, 91D may be provided. By the drive roller 91C and the auxiliary roller 91E, and the drive roller 91D and the auxiliary roller 91E, the respective separated label formation base materials LM may be delivered in the directions extending along the guide plates 99, 99.

As well as the above auxiliary rollers 51A, the auxiliary rollers 91E desirably have smaller height than the width of the non-adhesive layers PL of the label formation base materials LM in order to prevent the adhesives forming the adhesive layers AL from being stuck, and are installed at height positions corresponding to the non-adhesive layers PL so as not to be brought into contact with the adhesive layers AL on the adhering surfaces of the label formation base materials LM.

In the above embodiments, the cut units 60 having the guillotine type cutters are adopted. However, the cut units are not limited to this but laser cutting devices may be also adopted. By adopting the laser cutting devices as described above, the cut ends of the label formation base materials are not stuck onto the cut blades of the cut units, and the circumferential edges of the tack labels cut off from the label formation base materials are not brought into contact with and stuck onto the cut blades of the cut units unlike a case where the guillotine type cutters are used. Thus, even without performing complicated control such as temporarily bringing the cut ends of the label formation base materials LM away from the cut blades of the cut units 60 as in the above tack labeler 1A, the label formation base materials LM can be smoothly and reliably delivered. Moreover, even without adding an extra action such as bringing the suction plates 71 suctioning and holding the tack labels TL cut off from the label formation base materials LM away from the cut blades of the cut units 60, the tack labels TL suctioned and held onto the suction plates 71 are neither displaced nor dropped off from the suction plates 71, and the tack labels TL can be reliably adhered to predetermined positions of the articles to be adhered.

INDUSTRIAL APPLICABILITY

The present invention can be applied to a case where tack labels without using release papers are to be automatically applied.

The invention claimed is:

1. A tack labeler, comprising:

base material pair delivering means for reeling out and delivering a label formation base material pair from a base material pair roll formed by winding the label formation base material pair in a rolled shape, the label formation base material pair being formed by detachably pasting, to each other on the adhering surface side, label formation base materials in which tack labels are continuously joined to each other;

separating-delivering means for separating the delivered label formation base material pair into the label formation base materials and respectively delivering the label formation base materials;

cutting means for successively cutting the respective separated label formation base materials so as to form individual tack labels;

adhering means for adhering the formed individual tack labels to articles to be adhered; and wherein the separating-delivering means has rotating main rollers respectively arranged on the both sides of the label formation base materials so as to nip the label formation base materials, and auxiliary rollers for nipping the respective separated label formation base materials with the main rollers, wherein two pairs of the main rollers and the auxiliary rollers are adapted to deliver the nipped label formation base materials in the directions in which the label formation base materials are brought away from each other, wherein the auxiliary rollers are brought into contact with the adhering surface side of the label formation base materials when the label formation base materials are in contact with the main rollers, wherein adhering surfaces of the respective label formation base materials forming the label formation base material pair have band shape adhesive and non-adhesive areas extending in the longitudinal direction formed alternately in the width direction so that the adhesive areas of both the label formation base materials are not brought into contact with each other in a state that the adhering surfaces are pasted to each other, and wherein the auxiliary rollers are installed at positions corresponding to the non-adhesive areas so as not to be brought into contact with the adhesive areas of the adhering surfaces of the label formation base materials.

2. A tack labeler, comprising:

base material pair delivering means for reeling out and delivering a label formation base material pair from a base material pair roll formed by winding the label formation base material pair in a rolled shape, the label formation base material pair being formed by detachably pasting, to each other on the adhering surface side, label formation base materials in which tack labels are continuously joined to each other;

separating-delivering means for separating the delivered label formation base material pair into the label formation base materials and respectively delivering the label formation base materials;

cutting means for successively cutting the respective separated label formation base materials so as to form individual tack labels;

adhering means for adhering the formed individual tack labels to articles to be adhered; and wherein the separating-delivering means has rotating main rollers respectively arranged on the both sides of the label formation base materials so as to nip the label formation base materials, and auxiliary rollers for nipping the respective separated label formation base materials with the main rollers, wherein two pairs of the main rollers and the auxiliary rollers are adapted to deliver the nipped label formation base materials in the directions in which the label formation base materials are brought away from each other, and wherein the auxiliary rollers are brought into contact with the adhering surface side of the label formation base materials when the label formation base materials are in contact with the main rollers, wherein the cutting means cuts the label formation base materials by a guillotine cutter, and wherein when the tack labels are cut off from the label formation base materials by the guillotine cutter, the main rollers are reversely rotated so that cut ends of the label formation base materials are temporarily brought away from the guillotine cutter.

3. A tack labeler, comprising:

base material pair delivering means for reeling out and delivering a label formation base material pair from a base material pair roll formed by winding the label formation base material pair in a rolled shape, the label formation base material pair being formed by detachably pasting, to each other on the adhering surface side, label formation base materials in which tack labels are continuously joined to each other;

separating-delivering means for separating the delivered label formation base material pair into the label formation base materials and respectively delivering the label formation base materials;

cutting means for successively cutting the respective separated label formation base materials so as to form individual tack labels;

adhering means for adhering the formed individual tack labels to articles to be adhered; and wherein the separating-delivering means has rotating main rollers respectively arranged on the both sides of the label formation base materials so as to nip the label formation base materials, and auxiliary rollers for nipping the respective separated label formation base materials with the main rollers, wherein two pairs of the main rollers and the auxiliary rollers are adapted to deliver the nipped label formation base materials in the directions in which the label formation base materials are brought away from each other, wherein the auxiliary rollers are brought into contact with the adhering surface side of the label formation base materials when the label formation base materials are in contact with the main rollers, wherein the cutting means cuts the label formation base materials by a guillotine cutter, wherein the adhering means includes a suction head for suctioning and holding the tack labels cut off from the label formation base materials by the guillotine cutter, a first drive portion for bringing the suction head close to and away from the guillotine cutter, and a second drive portion for moving the suction head forward and backward relative to the articles to be adhered, and wherein the suction head suctioning and holding the tack labels cut off from the label formation base materials by the guillotine cutter is moved forward to the side of the articles to be adhered by the second drive portion in a state that the suction head is brought away from the guillotine cutter by the first drive portion, thereby adhering the tack labels to the articles to be adhered.

4. A tack labeler, comprising:

a plurality of rollers which reel out and deliver a label formation base material pair from a base material pair roll formed by winding the label formation base material pair in a rolled shape, the label formation base material pair being formed by detachably pasting, to each other on the adhering surface side, label formation base materials in which tack labels are continuously joined to each other;

rotating main rollers respectively arranged on the both sides of the label formation base materials so as to nip the label formation base materials, auxiliary rollers which nip the respective separated label formation base materials with the main rollers, the rotating main rollers and the auxiliary rollers together separating the delivered label formation base material pair into the label formation base materials and respectively delivering the label formation base materials;

a guillotine cutter which successively cuts the respective separated label formation base materials so as to form individual tack labels;

a suction head which suctions and holds the tack labels cut off from the label formation base materials by the guillotine cutter, a first drive portion for bringing the suction head close to and away from the guillotine cutter, and a second drive portion for moving the suction head forward and backward relative to the articles to be adhered, wherein two pairs of the main rollers and the auxiliary rollers are adapted to deliver the nipped label formation base materials in the directions in which the label formation base materials are brought away from each other, and wherein the auxiliary rollers are brought into contact with the adhering surface side of the label formation base materials when the label formation base materials are in contact with the main rollers.

5. The tack labeler according to claim 4, wherein adhering surfaces of the respective label formation base materials forming the label formation base material pair have band shape adhesive and non-adhesive areas extending in the longitudinal direction formed alternately in the width direction so that the adhesive areas of both the label formation base materials are not brought into contact with each other in a state that the adhering surfaces are pasted to each other, and wherein the auxiliary rollers are installed at positions corresponding to the non-adhesive areas so as not to be brought into contact with the adhesive areas of the adhering surfaces of the label formation base materials.

6. The tack labeler according to claim 5, wherein the guillotine cutter successively cuts the respective separated label formation base materials so as to form the individual tack labels, and wherein when the tack labels are cut off from the label formation base materials by the guillotine cutter, the main rollers are reversely rotated so that cut ends of the label formation base materials are temporarily brought away from the guillotine cutter.

7. The tack labeler according to claim 4, wherein the guillotine cutter successively cuts the respective separated label formation base materials so as to form the individual tack labels, and wherein the suction head suctioning and holding the tack labels cut off from the label formation base materials by the guillotine cutter is moved forward to the side of the articles to be adhered by the second drive portion in a state that the suction head is brought away from the guillotine cutter by the first drive portion, thereby adhering the tack labels to the articles to be adhered.

8. A tack labeler, comprising:

a plurality of rollers which reel out and deliver a label formation base material pair from a base material pair roll formed by winding the label formation base material pair in a rolled shape, the label formation base material pair being formed by detachably pasting, to each other on the adhering surface side, label formation base materials in which tack labels are continuously joined to each other;

rotating main rollers respectively arranged on the both sides of the label formation base materials so as to nip the label formation base materials;

auxiliary rollers which nip the respective separated label formation base materials with the main rollers, the rotating main rollers and auxiliary rollers together separating the delivered label formation base material pair into the label formation base materials and respectively delivering the label formation base materials;

a laser which successively cuts the respective separated label formation base materials so as to form individual tack labels;

a suction head which suctions and holds the tack labels cut off from the label formation base materials by the laser. a first drive portion for bringing the suction head close to and away from the laser, and a second drive portion for moving the suction head forward and backward relative to the articles to be adhered, wherein two pairs of the main rollers and the auxiliary rollers are adapted to deliver the nipped label formation base materials in the directions in which the label formation base materials are brought away from each other, and wherein auxiliary rollers are brought into contact with the adhering surface side of the label formation base materials when the label formation base materials are in contact with the main rollers.

9. The tack labeler according to claim 8, wherein adhering surfaces of the respective label formation base materials forming the label formation base material pair have band shape adhesive and non-adhesive areas extending in the longitudinal direction formed alternately in the width direction so that the adhesive areas of both the label formation base materials are not brought into contact with each other in a state that the adhering surfaces are pasted to each other, and wherein the auxiliary rollers are installed at positions corresponding to the non-adhesive areas so as not to be brought into contact with the adhesive areas of the adhering surfaces of the label formation base materials.

* * * * *